(12) United States Patent  (10) Patent No.: US 7,474,258 B1
Arikan et al.  (45) Date of Patent: Jan. 6, 2009

(54) SYSTEM AND METHOD FOR DETECTION AND DISCRIMINATION OF TARGETS IN THE PRESENCE OF INTERFERENCE

(75) Inventors: Orhan Arikan, Bilkent (TR); Donald Spyro Gumas, Middletown, MD (US)

(73) Assignee: Signal Labs, Inc., Reston, VA (US)

( * ) Notice: Subject to any disclaimer, the term of this patent is extended or adjusted under 35 U.S.C. 154(b) by 178 days.

(21) Appl. No.: 11/448,309

(22) Filed: Jun. 6, 2006

Related U.S. Application Data

(60) Provisional application No. 60/687,661, filed on Jun. 6, 2005.

(51) Int. Cl.
G01S 13/00 (2006.01)
G01S 13/58 (2006.01)
(52) U.S. Cl. .................. 342/159; 342/107; 342/189
(58) Field of Classification Search ............. 342/13–20, 342/27, 28, 89–112, 115, 118, 127–137, 342/159–162, 175, 189–197, 107; 367/87–95, 367/99–102; 708/4
See application file for complete search history.

(56) References Cited

U.S. PATENT DOCUMENTS

| | | | |
|---|---|---|---|
| 3,827,629 | A | 8/1974 | Max et al. |
| 3,858,208 | A | 12/1974 | Parke et al. |
| 4,339,176 | A | 7/1982 | Lee |
| 4,389,092 | A | 6/1983 | Tamura |
| 4,440,472 | A | 4/1984 | Cohen |
| 4,462,032 | A | 7/1984 | Martin |
| 4,468,093 | A | 8/1984 | Brown |
| 4,531,195 | A | 7/1985 | Lee |
| 5,416,488 | A | 5/1995 | Grover et al. |
| 5,499,030 | A | 3/1996 | Wicks et al. |
| 5,555,532 | A | 9/1996 | Sacha |
| 5,583,512 | A | 12/1996 | McEligot |
| 5,687,194 | A * | 11/1997 | Paneth et al. ............... 375/283 |
| 6,636,174 | B2 | 10/2003 | Arikan et al. |
| 6,703,968 | B2 | 3/2004 | Baugh |

(Continued)

FOREIGN PATENT DOCUMENTS

EP 31443 7/1981

(Continued)

OTHER PUBLICATIONS

U.S. Appl. No. 10/691,245, filed Oct. 21, 2003, Arikan et al.

(Continued)

Primary Examiner—Thomas H Tarcza
Assistant Examiner—Peter M Bythrow
(74) Attorney, Agent, or Firm—Jones Day

(57) ABSTRACT

Systems and method of detection and discrimination of targets in the presence of interference are disclosed. A system transmits a signal and then receives signals including interference and reflections of transmitted signals. The system processes the received signals and transmitted signals to generate a 2D representation of the STAP cube with one of the dimensions collapsed. The system then reduces the interference contributions and identifies angle and Doppler component of potential targets. The system then computes slices, which are one dimensional representation of cross-ambiguity functions of the received and transmitted signals. It reduces the interference contributions in the slices and determines range components of the targets.

83 Claims, 16 Drawing Sheets

U.S. PATENT DOCUMENTS

| | | | | |
|---|---|---|---|---|
| 7,038,618 | B2* | 5/2006 | Budic | 342/195 |
| 7,221,701 | B2* | 5/2007 | Arikan et al. | 375/148 |
| 2002/0030623 | A1* | 3/2002 | Arikan et al. | 342/195 |
| 2004/0085241 | A1 | 5/2004 | Arikan et al. | |

FOREIGN PATENT DOCUMENTS

| | | |
|---|---|---|
| EP | 851238 | 7/1998 |
| GB | 2320384 | 6/1998 |
| GB | 2386476 | 9/2003 |
| JP | 61212781 | 9/1986 |
| WO | WO 03026141 | 3/2003 |

OTHER PUBLICATIONS

U.S. Appl. No. 11/180,811, filed Jul. 12, 2005, Arikan et al.
M.K. Simon, J. K. Omura, R. A. Scholtz, and B. K. Levitt, Spread Spectrum Communications Handbook, pp. 1158-1214, McGraw-Hill, Inc., 1994.
P. M. Woodward, Probability and Information Theory, with Applications to Radar, Chapter 7, New York: Pergamon Press Inc., 1953.
R. E. Blahut, W. Miller and Jr. C. H. Wilcox, Radar and Sonar, Springer—Verlag, vol. 32, 1991.
A. K. Özdemir and O. Arikan, "Fast computation of the ambiguity function and the Wigner distribution on arbitrary line segments", IEEE trans. Signal Process., vol. 49, No. 2, pp. 381-393, Feb. 2001.
A. K. Özdemir and O. Arikan, "Efficient computation of the ambiguity function and the Wigner distribution on arbitrary line segments", in Proc. IEEE Int. Symp. Circuits and Systems, vol. IV, pp. 171-174, May 1999.
H. M. Ozaktas, O. Arkan, M. A. Kutay and G. Bozdagi, "Digital computation of the fractional Fourier transform", IEEE Trans. Signal Process., vol. 44, No. 9, pp. 2141-2150, Sep. 1996.
L. R. Rabiner, R. W. Schafer and C. M. Rader, "The Chirp z-Transform Algorithm", IEEE Transactions on Audio and Electroacoustics, vol. AU-17, No. 2, pp. 86-92, Jun. 1969.
I. D. Faux and M.J. Pratt, Computational Geometry for Design and Manufacture, pp. 304-308, Ellis Horwood 1979.
J. D. Foley, A. VanDam, S.K. Feiner, J.F. Hughes and R. L. Phillips, Introduction to Computer Graphics, pp. 321-368, Addison-Wesley, 1994.
D. F. Rogers and J. A. Adams, Mathematical Elements for Computer Graphics, 2nd edition, pp. 400-425, McGraw Hill 1989.
J. G. Proakis, Digital Communications, pp. 232-242, McGraw-Hill, NY, 1995.
V. Namias, "The fractional Fourier transform and its application in quantum mechanics," J. Inst. Maths. Applics., vol. 25, pp. 241-265, 1980.
W. Lohmann and B. H. Soffer, "Relationships between the Radon-Wigner and fractional Fourier transforms", J. Opt. Soc. Am. A, vol. 11, pp. 1798-1801, 1994.
I. Raveh and D. Mendlovic, "New properties of the Radon transform of the cross-Wigner/ambiguity distribution function", IEEE Trans. Signal Process., vol. 47, No. 7, pp. 2077-2080, Jul. 1999.
D. Mendlovic and H. M. Ozaktas, "Fractional Fourier transforms and their optical implementation: I" J. Opt. Soc. Am. A, vol. 10, pp. 1875-1881, 1993.
H. M. Ozaktas and D. Mendlovic, "Fractional Fourier transforms and their optical implementation: II", J. Opt. Soc. Am. A, vol. 10, No. 12, pp. 2522-2531, 1993.
L. B. Almedia, "The fractional Fourier transform and time-frequency Representations", *IEEE Trans. Signal Process.*, vol. 42, No. 11, pp. 3084-3091, Nov. 1994.
L. Cohen, "Time-frequency distributions—A review", Proc. IEEE, vol. 77, No. 7 pp. 941-981, Jul. 1989.
R. N. Bracewell, The Fourier Transform and its Applications, McGraw-Hill Book Company, pp. 356-381, 1978.
G. H. Golub and C. F. Van Loan, Matrix Computations, Baltimore: John Hopkins University Press, pp. 206-209, 222-227, 236-241, 248-253, 256-259, 1996.
P. W. East (ed.), Advanced ESM Technology, Microwave Exhibitions and Publishers Ltd., 1988.

V. G. Nebabin, Methods and Techniques of Radar Recognition, Artech House, Inc., pp. 106-125, 1995.
R. E. Kalman, "A new approach to linear filtering and prediction problems", J. Basic Engineering, Trans. ASME Series D, vol. 82, pp. 35-45, 1960.
Per-Olof Gutman and Mordekhai Velger, "Tracking Targets Using Adaptive Kalman Filtering", IEEE Trans. Aerospace and Electronic Systems, vol. 26, No. 5, pp. 691-699, Sep. 1990.
IBM Tech. Discl. Bull. (vol. 28, No. 9; pp. 4023-4025); "Processing the Echo from Range-Dependent Multiplexed Pulses in Range-Doppler Radar"; Published Feb. 1, 1986; IBM Corp.; Armonk, NY.
IBM Tech. Discl. Bull. (vol. 36, No. 1; pp. 226-227); "Computing the Aliased Ambiguity Surface"; Published Jan. 1, 1993; IBM Corp.; Armonk, NY.
D. Lush, "Airborne Radar Analysis Using the Ambiguity Function"; Proceedings of the IEEE International Radar Conference; pp. 600-605; copyrighted in the year 1990. IEEE Pub. No.CH2882-9/90/0000-0600.
F. Hlawatsch et al., "The Ambiguity Function of a Linear Signal Space and its Application to Maximum-Likelihood Range/ Doppler Estimation"; copyrighted in the year 1992; IEEE Pub. No. 0-7803-0805-0/92.
A.V. Dandawate et al., "Differential delay-Doppler estimations using second and higher-order ambiguity functions," 140 IEEE Proceedings 410-18 (Dec. 1993).
M. Rendas et al., "Ambiguity in Radar and Sonar," 46 IEEE Transactions on Signal Processing 294-305 (Feb. 1998).
C. Yin et al., "Performance Analysis of the Estimation of Time Delay and Doppler Stretch by Wideband Ambiguity Function," IEEE Publication 0-7803-4308-5/98 452-55 (1998).
A. Dogandzic et al., "Estimating Range, Velocity, and Direction with a Radar Array," IEEE Publication 0-7803-5041-3/99 2773-76 (1999).
W.K. Chung et al., "Pulse-Diverse Radar Waveform Design for Accurate Joint Estimation of Time Delay and Doppler Shift," Proceedings of the IEEE International Conference on Acoustics, Speech, and Signal Processing, pp. 3037-3040 (2000).
A. Dogandzic et al., "Cramer-Rao Bounds for Estimating Range, Velocity, and Direction with an Active Array," IEEE Transactions on Signal Processing, vol. 39, No. 6, Jun. 2001.
Misc. Prior Art Search Results (Patent Material-related search, Jul. 8, 2004; IEEE Searches, 2004).
European Patent Office Communication, dated Mar. 2, 2006 with Supplementary European Search Report dated Feb. 22, 2006, Appl. No. 01942045.4-2220 PCT/US0118408.
J. C. Wood and D. T. Barry, "Tomographic time-frequency analysis and its application toward time-varying filtering and adaptive kernel design for multiple component linear-fm signals," IEEE Trans. Signal Process., vol. 42, pp. 2094-2104, Aug. 1994.
J. C. Wood and D. T. Barry, "Linear signal synthesis using the Radon-Wigner transform," IEEE Trans. Signal Process., vol. 42, pp. 2105-2166, Aug. 1994.
J. C. Wood and D. T. Barry, "Radon transformation of time-frequency distributions for analysis of multicomponent signals," IEEE Trans. Signal Process., vol. 42, pp. 3166-3177, Nov. 1994.
R. Price, et al., A Communication Technique for Multipath Channels, 46 Proc. Inst. Rad. Eng. 555-70 (Mar. 1958).
J.R. Guerci, Space-Time Adaptive Processing for Radar, pp. 51-74, 169-180, Artech House, Aug. 2003.
R. Klemm, Principles of Space-Time Adaptive Processing, pp. 111-116, IEE, Apr. 2002.
G.T. Capraro et al., Knowledge-Based Radar Signal and Data Processing, vol. 23, No. 1, IEEE Signal Processing Magazine, pp. 18-29, Jan. 2006.
J.R. Guerci et al., Knowledge-Aided Adaptive Radar at DARPA, vol. 23, No. 1, IEEE Signal Processing Magazine, pp. 41-50, Jan. 2006.
M. Wicks et al., Space-Time Adaptive Processing, vol. 23, No. 1, IEEE Signal Processing Magazine, pp. 51-65, Jan. 2006.
M.E. Davis et al., Design of Large Space Based Radar for Multimode Surveillance, Proceedings of the 2003 IEEE Radar Conference, pp. 1-6.
A.G. Jaffer et al., Estimation of Range-Dependent Clutter Covariance by Configuration system Parameter Estimation, 2005 IEEE Int'l Radar Conference Record.

W.L. Melvin, Space-Time Adaptive Radar Performance in Heterogeneous Clutter, vol. 36, No. 2, IEEE Trans. AES, pp. 621-633, Apr. 2000.

R.L. Fante, Principles of Adaptive Space-Time Polarization Cancellation of Broadband Interference, The MITRE Corporation, Jan. 2004.

L.J. Griffiths et al., Space-Time Adaptive Processing in Airborne Radar Systems, IEEE Int'l Radar Conference, 2000.

H.N. Nguyen, Robust Steering Vector Mismatch Techniques for Reduced Rank Adaptive Array Signal Processing, Dissertation, Virginia Polytechnic Institute and State University, 2002.

S. Kogon et al., Bistatic STAP for Airborne Radar, ASAP Workshop, MIT Lincoln Laboratory, 2000.

S.W. Theis et al., Space-Time Adaptive Processing (STAP) Some Performance Limiting Factors, Presented to IEEE AESS, CAE Soft Corp., 2004.

Y. Seliktar, Space-Time Adaptive Monopulse Processing, Thesis, Georgia Institute of Technology, 1998.

S.T. Smith, Geometry and Invariance in Signal Processing, MIT Lincoln Laboratory, exact date not available.

L.T. Mazat, Radar Principles & Systems, Rice University, exact date not available.

Zavarsky et al., Introduction of cross ambiguity function for elimination of crossterms in Wigner distribution of the third order, Electronics Letters, vol. 32, No. 2, Jan. 18, 1996.

Wikipedia, Wigner Quasi-Probability Distribution, found Mar. 27, 2006 at http://en.wikipedia.org/wiki/Wigner_quasi-probability_distribution.

Wikipedia, Intermediate Frequency, found Mar. 30, 2006 at http://en.wikipedia.org/wiki/intermediate_frequency.

Dragoman et al., Implementation of the spatial and the temporal cross-ambiguity function for waveguide fields and optical pulses, Applied Optics, vol. 38, No. 5, Feb. 10, 1999.

PCT International Search Report mailed Aug. 20, 2001 for Int'l Application No. PCT/US2001/18408.

PCT International Preliminary Examination Report completed Mar. 28, 2002 for Int'l Application No. PCT/US2001/18408.

Communication from the European Patent Office dated May 24, 2006 for European Application No. 01942045.4.

Cooper et al., Modern Communications and Spread Spectrum, pp. 345-375, McGraw-Hill Book Co., 1986.

A.J. Viterbi, CDMA: Principles of Spread Spectrum Communication, pp. 77-96, 179-233, Addison-Wesley Publishing, 1995.

International Search Report, PCT/US06/22073 dated Mar. 5, 2007.

* cited by examiner

Project Each range-Doppler Plane (Cross-ambiguity function) to the angle-Doppler plane Doppler Shift

| 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 |
| 0 | 1 | 1 | 1 | 0 | 0 | 0 | 0 | 0 | 0 | 0 | 0 | 0 | 0 | 0 | 0 | 0 | 0 | 0 | 0 |
| 0 | 1 | 1 | 1 | 0 | 0 | 0 | 0 | 0 | 0 | 0 | 0 | 0 | 0 | 0 | 0 | 0 | 0 | 0 | 0 |
| 0 | 1 | 1 | 1 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 1 | 1 | 1 |
| 0 | 0 | 0 | 0 | 0 | 0 | 0 | 0 | 0 | 0 | 0 | 0 | 0 | 0 | 0 | 0 | 0 | 1 | 1 | 1 |
| 0 | 0 | 0 | 0 | 0 | 0 | 0 | 0 | 0 | 0 | 0 | 0 | 0 | 0 | 0 | 0 | 0 | 1 | 1 | 1 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 1 | 1 | 1 | 0 | 0 | 0 | 0 | 0 | 0 | 0 | 0 | 0 | 0 | 0 | 0 | 0 | 0 | 0 | 0 | 0 |
| 1 | 1 | 1 | 0 | 0 | 0 | 0 | 0 | 0 | 0 | 0 | 0 | 0 | 0 | 0 | 0 | 0 | 0 | 0 | 0 |
| 1 | 1 | 1 | 0 | 0 | 0 | 0 | 0 | 0 | 0 | 0 | 0 | 0 | 0 | 0 | 0 | 0 | 0 | 0 | 0 |

Angle

FIG. 10

| 0 | 0 | 0 | 0 | 0 | 0 | 0 | 0 | 0 | 1 | 1 | 0 | 0 | 0 | 0 | 0 | 0 | 0 | 0 | 0 |
|---|---|---|---|---|---|---|---|---|---|---|---|---|---|---|---|---|---|---|---|

Range Component

FIG. 15

SYSTEM AND METHOD FOR DETECTION AND DISCRIMINATION OF TARGETS IN THE PRESENCE OF INTERFERENCE

CLAIM OF PRIORITY AND INCORPORATION BY REFERENCE

This application claims priority of provisional application Ser. No. 60/687,661, filed Jun. 6, 2005 which is incorporated herein by reference. U.S. Pat. No. 6,636,174, U.S. application Ser. No. 09/875,116 (Pub. No. 2002/0030623), application Ser. No. 10/691,245 (Pub. No. 2004/0085241), and application Ser. No. 11/180,811 (Pub. No. 2006/0082491) are also incorporated herein by reference for all purposes.

FIELD OF INVENTION

This invention relates generally to Space-Time Adaptive Processing (STAP) technology and more particularly to computationally effective discrimination, detection and tracking of targets in the presence of interference, such as environmental clutter and intentional jamming.

BACKGROUND OF INVENTION

A typical prior art STAP system comprises a phased-array antenna with N transmit elements and N receive elements. The receiver antenna gain pattern can be steered in a desired direction through a beam forming process. The STAP system operates using a pulse train and coherent pulse integration. The Coherent Processing Interval (CPI) defines the duration of the pulse train. During each CPI the transmitter sends out M pulses (or signals). The time between the beginning of a pulse and the beginning of the next pulse is called a Pulse Repetition Interval (PRI). The pulses reflect from objects at different distances from the STAP system. The antenna elements then receive the reflections of the pulses. The distance to an object (or the range) may be determined by the amount of time that passes between the sending of a pulse and receiving of its reflection, referred to as time delay. The STAP system collects the reflections for each antenna element (1 through N), for each pulse (1 through M), and for each range. The data received from these reflected signals can be conceptually assembled into a three-dimensional matrix which is sometimes called "the STAP cube."

There is a trade-off associated with selecting an optimal PRI value for the prior art STAP systems. On one hand, longer PRI minimizes range ambiguity. In particular, it is desirable to receive reflections of one pulse from all targets before sending the next pulse. If PRI is relatively short, then a reflection received after a transmitted pulse would create an ambiguity as to whether it is a reflection of this pulse or the previously transmitted pulse. Selecting a longer PRI would mitigate the effects of this ambiguity. On the other hand, for coherent pulse integrating systems, longer PRI increases Doppler shift ambiguity. The inverse of PRI is called Pulse Repetition Frequency (PRF). PRF determines the maximum unambiguous Doppler shift for a target. Targets for which the absolute value of Doppler shifts is greater than one half PRF results in aliasing in the Doppler shift domain and appear to be at some Doppler shift with an absolute value that is less of than or equal to one half PRF.

Prior art STAP systems, which require a high PRF to attain a desired maximum unambiguous Doppler shift value are, however, limited as to the maximum allowable transmit pulse duration. As the PRF is increased, less time is available to transmit the pulse and wait for the return. For high operating frequencies, fast target velocities, and large unambiguous distances, this can result in very short pulse durations. Transmitting short pulses leads to the need to transmit high peak powers so that sufficient total energy is transmitted to the target.

Prior art STAP systems use a matched filter to detect the reflected signal. The matched filter performs well in detection of the reflected signal obscured by noise as long as the reflected signal matches the transmitted signal temporally, that is, as long as the reflected signal has not been Doppler shifted with respect to the transmitted signal. To the extent that the reflected signal has been Doppler shifted relative to the transmitted signal, the detection sensitivity of the matched filter degrades. If the Doppler shift is large enough, the detection sensitivity of the matched filter will be insufficient and an additional matched filter will be required, matching to the Doppler shifted version of the transmitted signal. The need of multiple matched filters in the prior art STAP systems is costly as it requires multiple subsequent, computationally intensive STAP detection system components.

There are two general classes of signals that can be characterized for detection through a matched filter: Doppler fragile and Doppler tolerant signals. Introducing a Doppler shift in Doppler fragile signals results in quickly degrading detection sensitivity through a matched filter. Doppler fragile signals include pseudorandom number (PN) coded signals, frequency stepped COSTAS signals, and in general most long arbitrarily modulated signals. Introducing a Doppler shift in Doppler tolerant signals results in continued sufficient detection sensitivity through a matched filter for most Doppler shifts of interest. Doppler tolerant signals include signals of very short duration and linear FM chirped signals. In terms of system performance, Doppler fragile signals can be characterized as providing high Doppler shift resolution, low probability of intercept in adversarial conditions, good performance in the presence of multiple coexisting and co-operating systems, and difficult to counter with electronic jamming. Doppler tolerant signals often are characterized as easier to generate, transmit and receive, poor Doppler shift resolution, harder to conceal from undesired receivers, and easier to counter with electronic jamming.

Because of the undesirability of multiple matched filters in the prior art STAP systems, they are typically designed to utilize Doppler tolerant signals. The inability of the prior art STAP systems to effectively process Doppler fragile signals limits the types of signals that can be used by such systems to only a few. This makes it easy for an enemy to detect the transmitted signals and use Electronic Countermeasures (ECM) to jam them.

After receiving all signals in the CPI, which comprise the STAP cube, and constructing the STAP cube, prior art STAP systems coherently process all of the received signals across all of the antenna elements at all time delay values. This coherent processing is the equivalent of a two dimensional Fourier transformation at each range value and it effectively transforms the three dimensions of the STAP cube to angle, Doppler shift (or velocity), and range time delay (or range) and a reflected signal amplitude for each three dimensional coordinate within the STAP cube. For any given angle in the STAP cube, the time delay-Doppler shift plane is equivalent to a cross-ambiguity function of the transmitted and received signals for that look angle, over the unambiguous range and Doppler extent of the given PRI. The cross-ambiguity function of a transmitted and received signal is defined according to the following equation:

$$A_{rs} = \int r(t+\tau/2)s^*(t+\tau/2)\exp[j2\pi vt]dt,$$

where:
  s(t) is the transmitted signal,
  r(t) is the received signal,
  τ is delay time, and
  v is Doppler shift.

The prior art STAP system has to "null" out interference. The interference comes from many different sources. One type of interference is noise that is present due to the receiver thermal noise, random terrestrial natural and man made emissions, and cosmic background radiation. Another type of interference is clutter which is the result of reflections of the transmitted signals from stationary natural or manmade objects like land, bodies of water, trees, hills and buildings. When the STAP system is in motion, such as in an airborne platform, clutter manifests with Doppler shifts that are a predictable function of look angle, relative to the STAP platform motion. In particular, signals that are sent in the direction coinciding with the movement of the STAP system have a positive Doppler shift when they reflect from clutter. Likewise, signals that are sent in the direction opposite to the movement of the STAP system have a negative Doppler shift when they reflect from clutter. Another type of interferences is signals from ECM, which is a deliberate interference intended to prevent reception of reflected signals at certain frequencies.

To detect targets in real time, interference, should preferably be identified and nulled out during the CPI. The prior art STAP systems have to perform a complex and processor intensive calculations. As a part of such calculations, prior art STAP systems collect the data which comprises the STAP cube and coherently process across N pulses and M antenna elements. To achieve the nulling of the interference, this coherent process is modified by the multiplication of the inverted covariance matrix of the data in the STAP cube. The covariance matrix represents the interference present during detection. Prior art STAP systems perform real time adaptive covariance matrix generation as well as covariance matrix generation using prior knowledge and databases that correlate to the operating environment. Generation of this covariance matrix and its inverse is performed using the three dimensional STAP cube data, and it is a computationally costly process.

After the interference has been nulled out, the STAP system can identify moving targets by comparing the remaining values in the processed angle-Doppler shift-time delay STAP cube to a predetermined threshold.

For real time target detection and tracking, all calculations on a single set of received signals have to be performed during one CPI, before the next set of reflections is received. The processing of the prior art STAP systems comprises processor-intensive three-dimensional matrix computations. Some prior art STAP systems attempt to optimize these matrix computations. However, coherent processing and interference nulling in three dimensions remain to be the tasks of STAP that require significant processing resources, which severely limit the practicality, applicability and cost effectiveness of prior art STAP systems.

As mentioned above, due to the matched filter intolerance to Doppler fragile signals, the prior art STAP systems are typically limited to transmit Doppler tolerant signals. Using Doppler tolerant signals precludes using pseudorandom number (PN) coded signals, frequency stepped COSTAS signals, and in general most long arbitrary modulation type signals, which is desirable for improving range and Doppler shift resolution, target imaging, operational stealth, and defeating ECM.

The prior art STAP systems are further limited by the power constraints. In particular, because they are typically pulse train systems transmitting short pulses, they require high peak transmit power to get sufficient total energy transmitted out to the target. Transmit device power and thermal constraints limit the extent to which this peak power can be practically increased. Therefore the prior art STAP systems have a maximum practical range limitation as a direct result of their short pulse duration.

Accordingly, there is presently a need to provide systems and methods for detection and discrimination of targets in the presence of interference that will overcome the limitations and deficiencies of the prior art STAP systems.

SUMMARY OF THE INVENTION

Accordingly, an object of the present invention is to provide systems and methods for detection and discrimination of targets in the presence of interference that reduce or eliminates the time delay-Doppler shift ambiguity trade-off.

Another object of the present invention is to reduce the peak power requirements of the transmitted waveform.

Another object of the present invention is to increase detection sensitivity by enabling more energy on target while maintaining reduced waveform peak power.

Another object of the present invention is to reduce the processing interval required to achieve detection of a given target at the desired probability of detection.

Another object of the present invention is to enable the use of pseudorandom number (PN) coded waveform, COSTAS waveforms, or other waveforms that can be coded during the STAP system operation for improved time delay and Doppler shift resolution, target imaging, operational stealth, and imperviousness to ECM.

Another object of the present invention is to increase duty cycles to make more efficient use of the time available in the target interrogation schedule.

Another object of the present invention is to reduce required processing by computing magnitude squared projections and slices of the cross-ambiguity function instead of computing the entire cross-ambiguity function.

Broadly, the embodiments of the present invention relate to a STAP system, or any other Doppler radar system comprising a waveform generator, a transmitter, and a transmitter array, a receiver array, a receiver, a signal processor, a tracker, and a display.

The waveform generator produces a signal, the transmitter amplifies the produced signal and converts it to analog format, and the transmitter array transmits the processed signal over the transmission medium.

The receiver array receives signals that include interference and the reflections of the transmitted signals. The receiver amplifies and digitizes the received signals and passes them to the signal processor. The signal processor computes projections of cross-ambiguity functions associated with look angles. FIG. 11 illustrates a cross-ambiguity function. A plurality of these projections constitute a TEST PROJECTION. The signal processor computes a PROJECTION INTERFERENCE ESTIMATE, which is an interference contribution(s) for the same angle-Doppler shift space. Then the signal processor computes a NORMALIZED PROJECTION INTERFERENCE ESTIMATE by normalizing the PROJECTION INTERFERENCE ESTIMATE, so the magnitude of interference contributions in the TEST PROJECTION and PROJECTION INTERFERENCE ESTIMATE are approximately the same. The signal processor reduces the interference contribution(s) of the TEST PRO- JECTION by filtering out the NORMALIZED PROJECTION INTERFERENCE ESTIMATE and computes an PROJECTION TARGET ESTIMATE. Then, the signal processor determines the angle and Doppler shift coordinates of targets by comparing values of the projection to a threshold and records this information in a PROJECTION THRESHOLD EXCEEDANCE.

The signal processor computes a TEST SLICE of the cross-ambiguity functions associated with the determined angle and the Doppler shift. After the signal processor computes the TEST SLICE it computes a SLICE INTERFERENCE ESTIMATE illustrated in FIG. 13. Signal processor computes a SLICE TARGET ESTIMATE by filtering the SLICE INTERFERENCE ESTIMATE from the TEST SLICE. Then the signal processor generates a SLICE THRESHOLD EXCEEDANCE by comparing values of the SLICE TARGET ESTIMATE to a threshold. The SLICE TARGET ESTIMATE contains information regarding time delay of one or more targets for the angle and Doppler shift at which the signal processor has computed the slice.

The signal processor then generates a target report based on this information. The tracker monitors movement of targets by monitoring the movement of targets over time.

In particular, a method for detecting one or more targets comprising: receiving signals that include interference and reflections of transmitted signals from the one or more targets, computing one or more projections of cross-ambiguity functions corresponding to processed or unprocessed received signals and the transmitted signals, processing the one or more computed projections to reduce interference contribution(s), determining an angle and a Doppler component for at least one target based on the processed computed projections, and for the determined angle and Doppler component, determining a corresponding range component for the at least one target is disclosed.

BRIEF DESCRIPTION OF THE DRAWINGS

The present invention may be understood more fully by reference to the following detailed description of the exemplary embodiments and the appended figures in which:

FIG. 10 illustrates an projection threshold exceedance;

Figure 15:
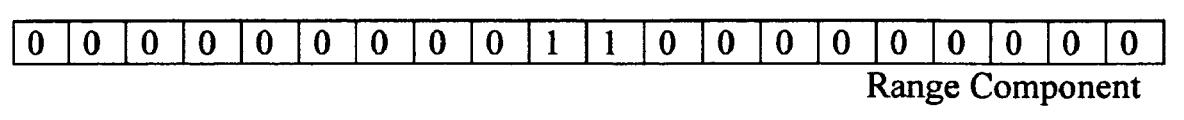

FIG. 15 illustrates a slice threshold exceedance; and

DETAILED DESCRIPTION OF THE EMBODIMENTS

The following nomenclature and definitions are common to all embodiments of the invention disclosed herein and the claims.

"Range component" means a distance or time delay; "time delay" means a 2-way travel time of the transmitted signal and its reflection back; and "Doppler component" means a Doppler shift or velocity; "Doppler shift" means perceived difference in frequency between the received and transmitted signals;

"Angle" means the perceived direction of the target relative to the reference direction;

"Cross-ambiguity function"—a measure of similarity of a transmitted signal and a received signal expressed with the following equation:

$$A_{rs} = \int r(t+\tau/2)s^*(t+\tau/2)\exp[j2\pi\nu t]dt,$$

where:
s(t) is the transmitted signal,
r(t) is the received signal,
$\tau$ is delay time, and
$\nu$ is Doppler shift.

"Projection of a cross-ambiguity function" means $$P_\phi(u) = \int |A_{rs}(u\cos\phi - v\sin\phi, u\sin\phi + v\cos\phi)|^2 dv,$$

where:
$A_{rs}(\tau, \nu)$ is the cross-ambiguity function evaluated at time delay $\tau$ and Doppler shift $\nu$,
$\phi$ is the projection angle,
$v$ is the projection path, at an angle $\phi$ with respect to the delay axis of the cross-ambiguity function, and
$u$ is projection axis, perpendicular to the projection path;

"Slice of a cross-ambiguity function" means $$A_{rs}(\tau_0 + \lambda \sin\phi, \nu_0 + \lambda \cos\phi) = \int \hat{r}_{2\phi/\pi}(\mu)\hat{s}^*_{2\phi/\pi}(\mu)\exp[j2\pi\mu]d\mu,$$

where:
$\tau_0$ is the starting delay time of the slice,
$\nu_0$ is the starting Doppler shift of the slice
$\lambda$ is the distance of the computed slice sample from the starting point
$\phi$ is the angle of the slice and where:
$\hat{r}(t) = r(t+\tau_0/2)\exp[j\pi\nu_0 t]$ and
$\hat{s}(t) = r(t-\tau_0/2)\exp[j\pi\nu_0 t]$ are the fractional Fourier transforms of the shifted and modulated received and transmitted radar waveforms, and where:
$X_{2\phi/\pi}(t) = \int K_{2\phi/\pi}(t,t')x(t')dt'$ defines the fractional Fourier transformation and where:
$\phi$ is the transformation angle
$K_{2\phi/\pi}$ is the transformation kernel defined as:

$$K_{2\phi/\pi}(t,t') = k_\phi \exp[j\pi(t^2\cot\phi - 2tt'\csc\phi + t'^2\cot\phi]$$

With complex scaling $k_\phi$ defined as:

$$k_\phi = \frac{\exp\{j\phi/2 - \pi/4\mathrm{sgn}\phi 22/\}}{\sqrt{|\sin\phi|}};$$

"Detecting" means to determining an angle, Doppler component, and range component;

"Interference"—undesired signals that inhibit processing of the received signals;

"Interference contributions"—a difference between an actually received signal and the same received signal if received without any interference;

"Clutter"—interference caused by natural or manmade objects;

"Noise"—interference that appears random;

"Electronic countermeasures"—systems and methods designed to reduce a radar's effectiveness; and "Orthogonal" means a property of modulation of a signal which when used minimizes degradation during the detection process in the presence of another signal.

Figure 1A:
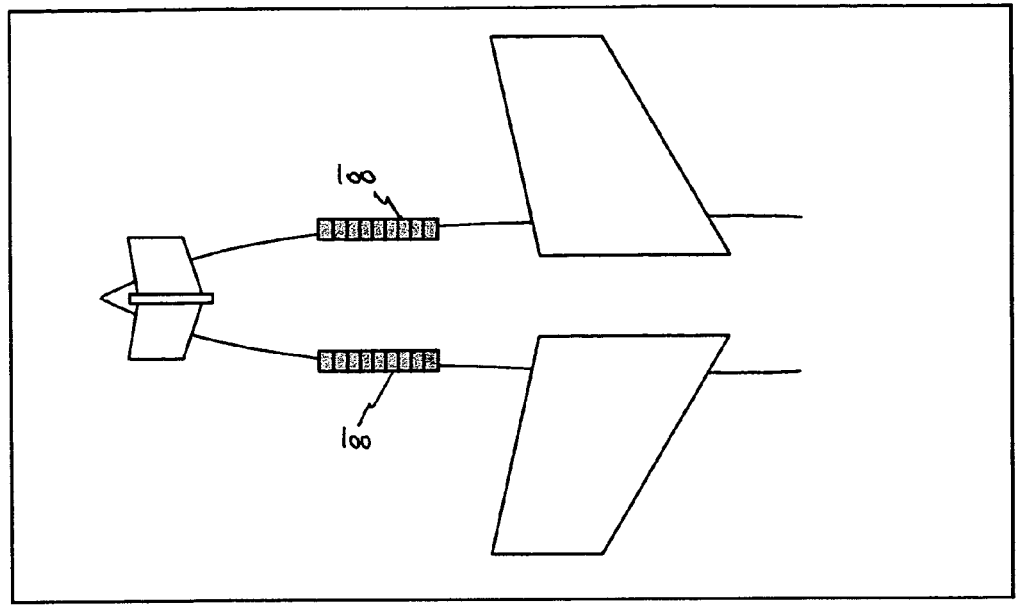
FIG. 1A illustrates the mounting of a STAP system on an aircraft.
Figure 1B:
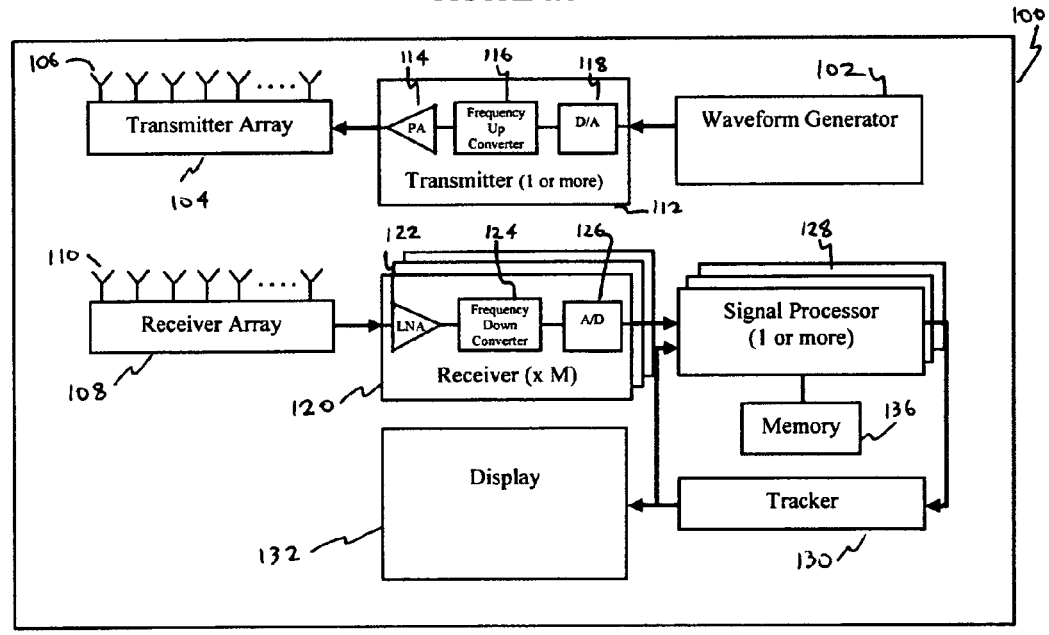
FIG. 1B illustrates the basic components of the system according to the preferred embodiment of the invention.
Figure 1C:
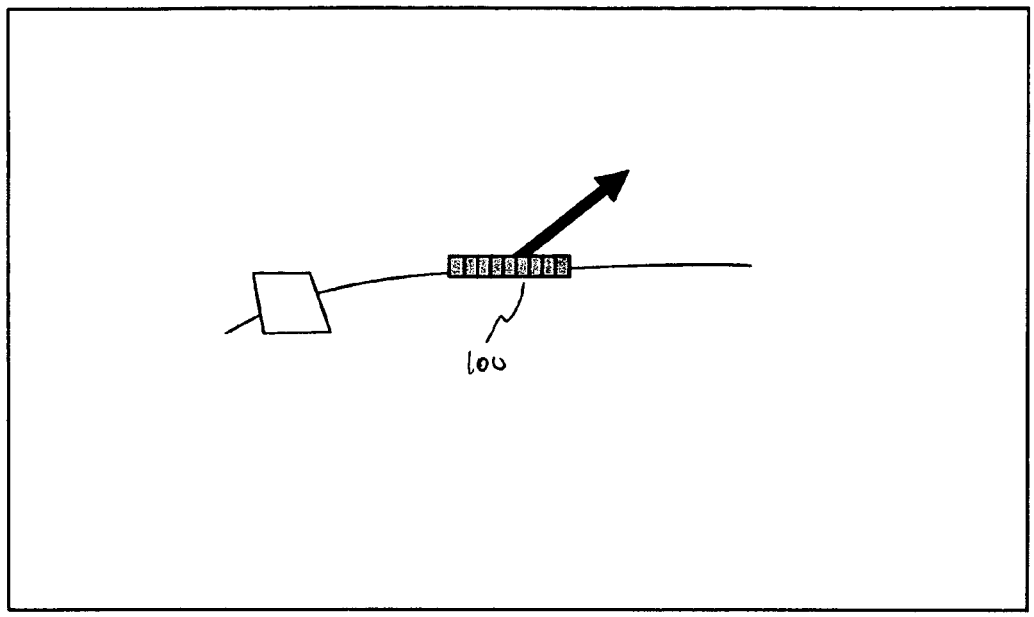
FIG. 1C illustrates a directed beam transmitted at a certain angle by a phased array transmitter element.
Figure 1D:
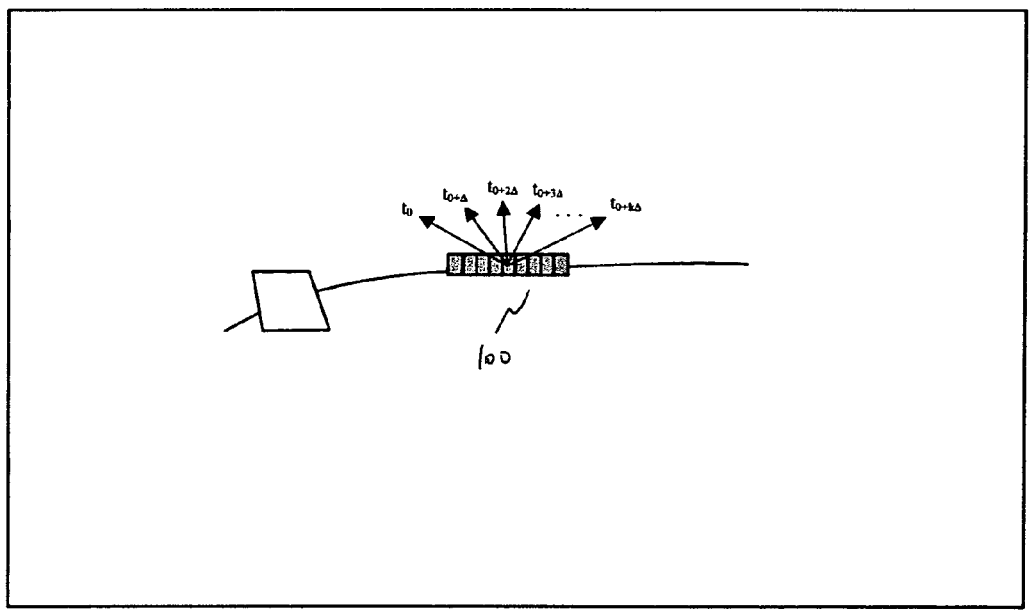
FIG. 1D illustrates a signal beam formation when only one transmitting element is present.

FIGS. 1A-B illustrate STAP system 100 in accordance with the present invention. STAP system 100 is typically resides on an aircraft as shown in FIG. 1A with antennas oriented for broadside detection. In the preferred embodiment the STAP system is monostatic that is both transmitters and antennas are enclosed within the same physical structure. In some embodiments the STAP system is bistatic, that is transmitters and antennas are physically separated. FIG. 1B illustrates the components of STAP system 100.

Waveform generator 102 generally provides the manifestation of the outgoing waveform. Because the STAP system is not limited by the matched filter of the prior art systems, waveform generator 102 is operable to generate various signals that could not be used by the prior art systems. Waveform generator 102 is operable to generate any waveform including both Doppler shift fragile and Doppler shift tolerant waveforms. In particular, waveform generator 102 is operable to generate pseudo random number (PN) coded waveforms, in which phase is modulated as a function of a generated code, and frequency stepped COSTAS waveforms (sometimes simply referred to as COSTAS), in which frequency steps depend a code. Waveform generator 102 is also operable to generate linear frequency modulation (LFM) waveforms and continuous waveforms (CW).

Waveform generator 102 passes the generated waveform to transmitter 112. Transmitter 112 comprises digital-to-analog converts 114, frequency converters 116 and power amplifiers 118 required to satisfy the interface requirements of the transmission medium, such as water, air, of free space.

Transmitter 112 passes the processed waveform to transmit array 104, which transmits. In one embodiment, transmit array 104 consists of multiple independent transmitting elements 106, such as a RF antennas or acoustic transducers. Beam formed transmitted signals are generated by multiplying the transmitted signal by a set of complex coefficients. In another embodiment, transmit array 104 consists of a single transmitting element.

Receive array 108 receives signals including interference and reflections of the transmitted signals. In the preferred embodiment, receive array 108 consists of multiple independent receiving elements 110, such as a RF antennas or acoustic transducers. In one embodiment, by multiplying received signals by a set of complex coefficients, the STAP system generates received signals at multiple look angles. In another embodiment, the STAP system combines the look angle formation with subsequent processing.

Receiver array 108 passes the received signals to receiver 120. Receiver 120 comprises low noise amplifier 122 operable to perform low noise amplification to elevate the voltage of the received signals to working levels, frequency converter 124 operable to convert the frequency of the received signals to baseband frequency, and an analog-to-digital converter 126 operable to digitizes the received signals for subsequent processing by signal processor 128. In the preferred embodiment, transmit array 104 and receive array 108 share the same physical structure 134. In another embodiment, transmit array 104 and receive array 108 are enclosed in different physical structures.

Signal processor 128 performs the detection process that discriminates targers from interference, determines signals that exceed a detection threshold, classified as targets. Tracker 130 computes the course of detected targets.

Tracker 130 can also perform further target discrimination by analyzing the trajectory of targets. Also connected to signal processor 128 and tracker 130 are one or more memories 136. These memories store instructions for execution by the modules of signal processor 128 and tracker 130, data received from the receiver 120, as well as other types of information, such as results of intermediate computations. Display 132 provides the output data presentation to users. In one embodiment STAP system 100 includes only one signal processor 128. In alternative embodiments, STAP system 100 comprises two or more signal processors 128.

Figure 2:
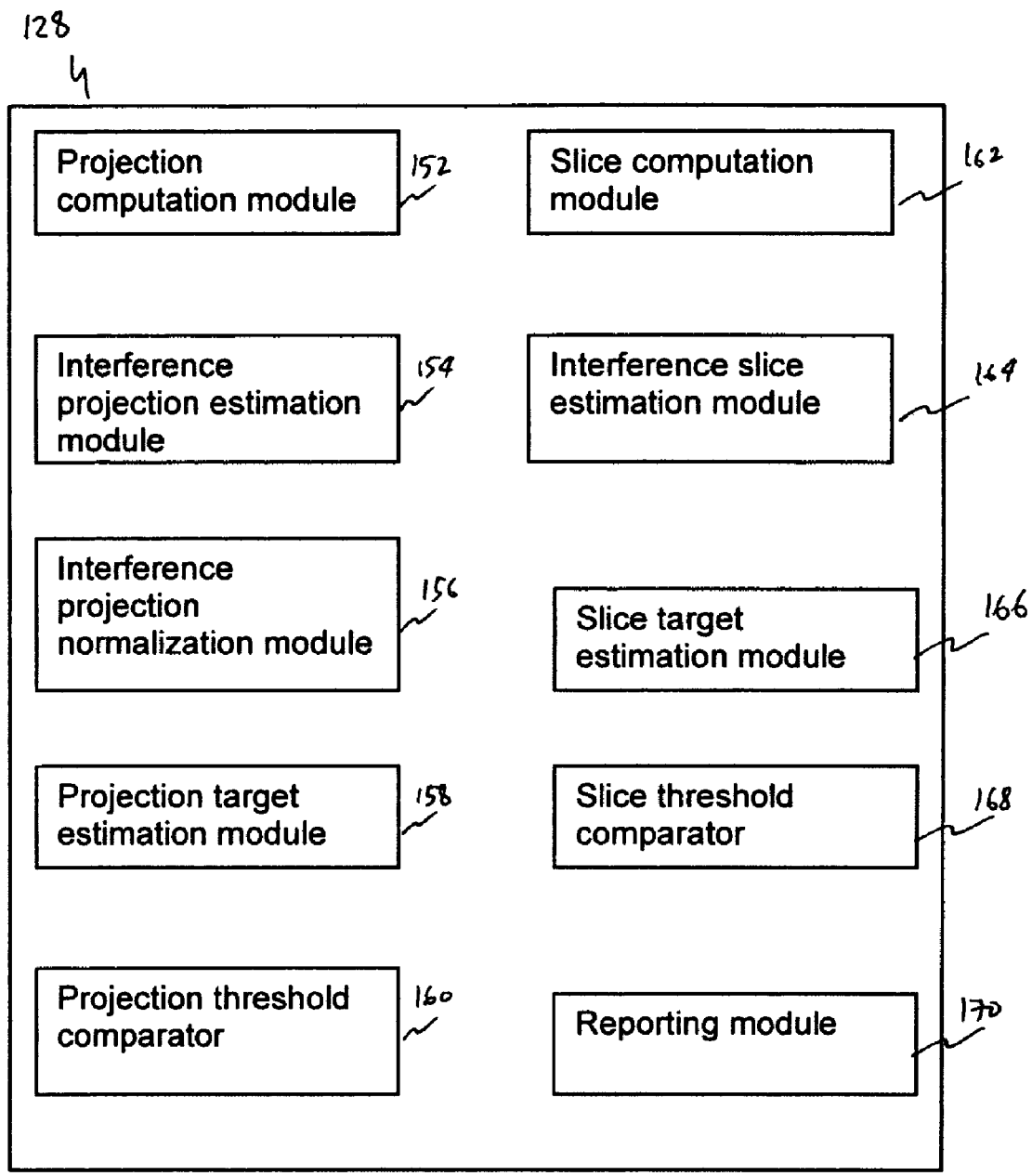
FIG. 2 illustrates modules of the signal processor of the STAP system.

FIG. 2 shows various modules of one or more signal processors 128 according to the preferred embodiment. In particular, projection computation module 152 is operable to compute projections of a cross-ambiguity surface based on the transmitted and the received signals without calculating the complete cross-ambiguity surface. Interference projection estimation module 154 is operable to estimate interference in the angle-Doppler component domain. Interference projection normalization module 156 is operable to make the interference estimate in the angle-Doppler component domain to be approximately of the same magnitude as interference contributions to the projections. Projection target estimation module 158 is operable to reduce the contributions of interference of the projections. Projection threshold comparator 160 is operable to perform comparison of values of projections to a threshold. Slice computation module 162 is operable to compute slices of a cross-ambiguity surface based on the transmitted and the received signals without calculating the complete cross-ambiguity surface. Interference slice estimation module 164 is operable to estimate interference contribution to computed slices. Slice target estimation module 166 is operable to reduce interference contribution to slices. Slice threshold comparator 168 is operable to perform comparison of values of slices to a threshold. Reporting module 170 is operable to generate reports of detected targets and forward them to tracker 130. The modules of signal processor 128 may be implemented as software modules executed on signal processor 128, or as specialized hardware circuitry incorporated in signal processor 128, or both. The modules may be distributed across multiple signal processors 128, or may even be distributed across different machines. In one embodiment all modules can read from and write to memories 136. In an alternative embodiment only some of the modules can read from and write to memories 136.

Modules of signal processor 128 are operable to determines angles, Doppler components and range components of targets. In the preferred embodiment, Doppler components determined by the modules of signal processor 128 are Doppler shifts and range components are time delays. However in other embodiments, the determined Doppler components are velocities of targets or range components are distances to targets, or both. A person of ordinary skill in the art would understand that Doppler shift resulting from the motion of the target is related to the velocity of the target, and having determined the Doppler shift of the target, it is possible to determine the velocity of the target and vise-versa. Similarly, a person of ordinary skill in the art would understand that time delay of getting a reflection of a signal from a target is related to the distance to that target, and having determined the time delay associated with a target, it is possible to determine the distance to the target and vise-versa. The disclosure of embodiments of the invention below refers to determining Doppler shift and time delay. It should be understood that embodiments are not limited to determining Doppler shifts and time delays, but may also be used to determine velocity and range of the targets, and that the discussion in terms of Doppler shifts and time delays are for illustration only.

In a preferred embodiment, waveform generator 102 is operable to generate waveforms for a predetermined time delay and Doppler shift resolution characteristics for the specified types of targets that are being sought in a particular type of interference environment anticipated. For example, one type of waveform may be generated when seeking tanks in a hilly terrain, while another type of waveform may be generated when seeking trucks in a desert in the presence of jamming, while a third type of waveform may be generated when seeking aircrafts in the surrounding cloudy sky. Due to the reduced number of computations required to detect targets according to the embodiments of present invention, the use of longer arbitrarily complex modulation types to generate waveforms is practical. These arbitrarily complex modulation types enable generation of Doppler fragile waveforms for enhanced target characterization, classification, resolution and imaging. Furthermore, longer waveforms enable transmission of low peak power signals, which reduces the ability of the enemy to detect these signals and to initiate an effective countermeasure, such as jamming with ECM devices. Additionally, the use of Doppler fragile waveforms by waveform generator 102 enables the use of modulation types of signals that are even more difficult to detect.

Transmitter 112 processes the generated waveform so it is most suitable for transmission through the selected media, such as air, water, free space, etc. Digital-to-analog converter 114 converts the generated waveform to the analog mode, frequency converter 116 changes the frequency of the waveform, and power amplifier 118 increases the amplitude of the waveform.

In the preferred embodiment, transmitter 112 feeds the modified waveform to transmitter array 104. Multiple transmitting elements 106 perform the beam forming operation of the processed waveform. In this embodiment, the transmitted signals can be electronically steered to a desired look angle. The phase shift of each transmitting element 106 is determined by the desired angle of transmission. In another embodiment, transmitter array 104 comprises only a single transmitting element 106. In this embodiment the transmitted signal typically cannot be electronically steered.

In the preferred embodiment, receive array 108 receives signals that include interference and reflections of the transmitted signals from the targets. Receive array 108 produces multiple independent channels of the received data. Because spatially separated receiver elements 110 produce the multiple independent channels, digital beam forming is possible for directing the receiver array 106 gain pattern towards the desired look angle.

In the preferred embodiment, elements of receiver 120 pre-process the received signals. In particular, low noise amplifiers 122 performs low noise amplification to elevate the voltage of the received signals to working levels. Frequency converters 124 converts the frequency of the received signals to baseband frequency. Analog-to-digital converters 126 digitizes the received signals for subsequent processing by signal processor 128.

In one embodiment, signal processor 128 multiplies the received signals by a set of complex coefficients, thus directing the receiver array 106 gain pattern towards the desired look angle, and then performs the rest of the processing on the signals as a function fo calculated look angles. In another embodiment, signal processor 128 performs some of the processing of the received signals without first directing receiver array gain pattern towards the desired look angles, on the received signals associated with the receiver elements. In that embodiment, signal processor 128 first performs a part of the processing on the signals associated with receiving elements, and applies beam forming techniques to intermediate results to associate with calculates look angles, as an intermediate step. Associating the received signals with look angles as an intermediate step of the received signal processing allows performing this operation on the partially processed and reduced set of values by signal processor 128.

Figure 3:
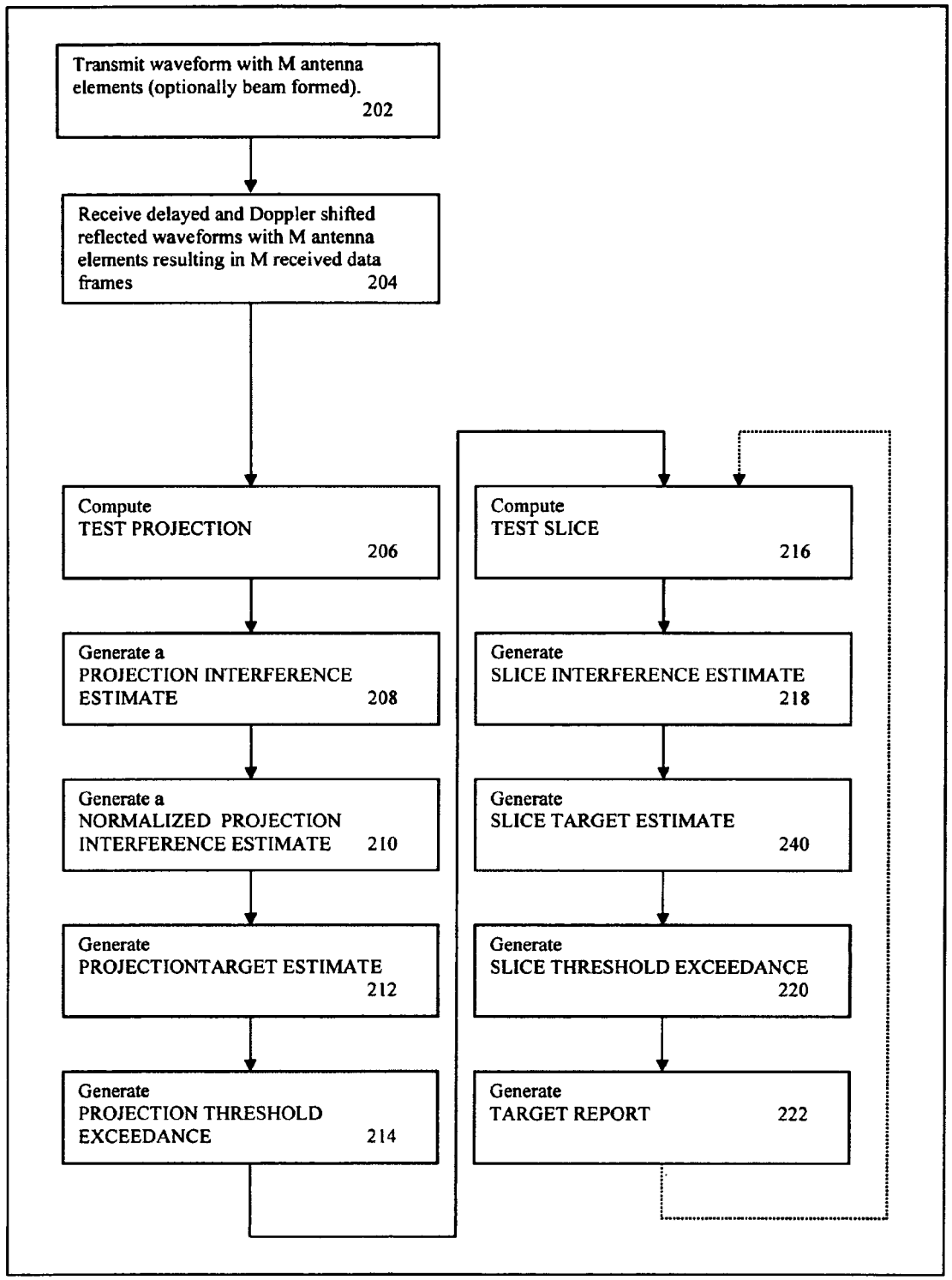
FIG. 3 is a flow diagram of the STAP system's operation.
Figure 4:
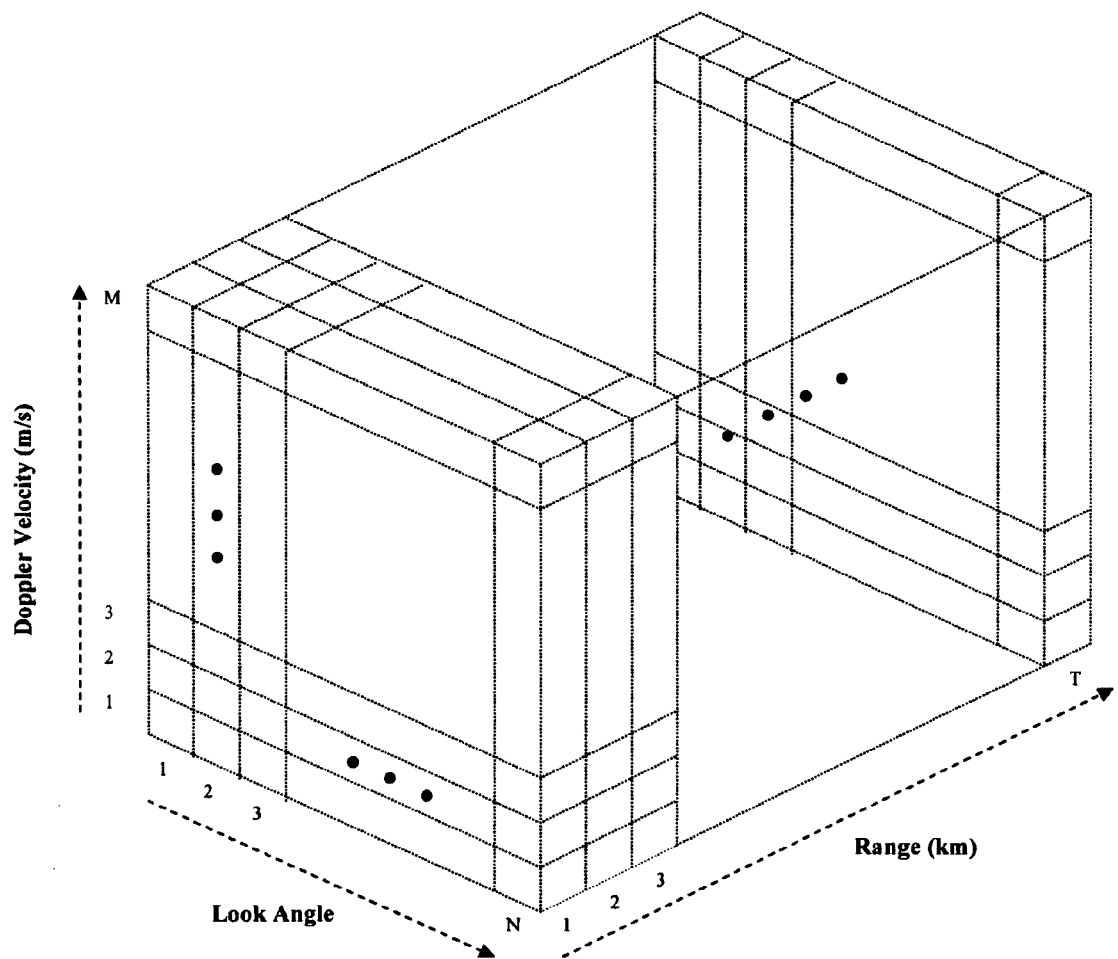
FIG. 4 illustrates the STAP cube.

FIG. 3 shows the steps performed by the modules of signal processor 128 when detecting targets and discriminating them from interference. In step 204, signal processor 128 receives signals as described above. FIG. 4 illustrates the logical arrangement of the received signals by signal processor 128 in one embodiment. The arrangement shown in FIG. 4 is the STAP cube, which is known in the art. In the embodiment, in which signal processor 128 associates signals with look angles as they are received by the receiver array 108 the dimensions of the cube that gets projected in subsequent steps are angle-Doppler shift-time delay. In the embodiment, in which signal processor 128 associate the received signals with look angles as an intermediate step of the received signal processing, the dimensions of the STAP cube that gets projected in the subsequent steps are receiver element-Doppler shift-time delay.

Figure 5A:
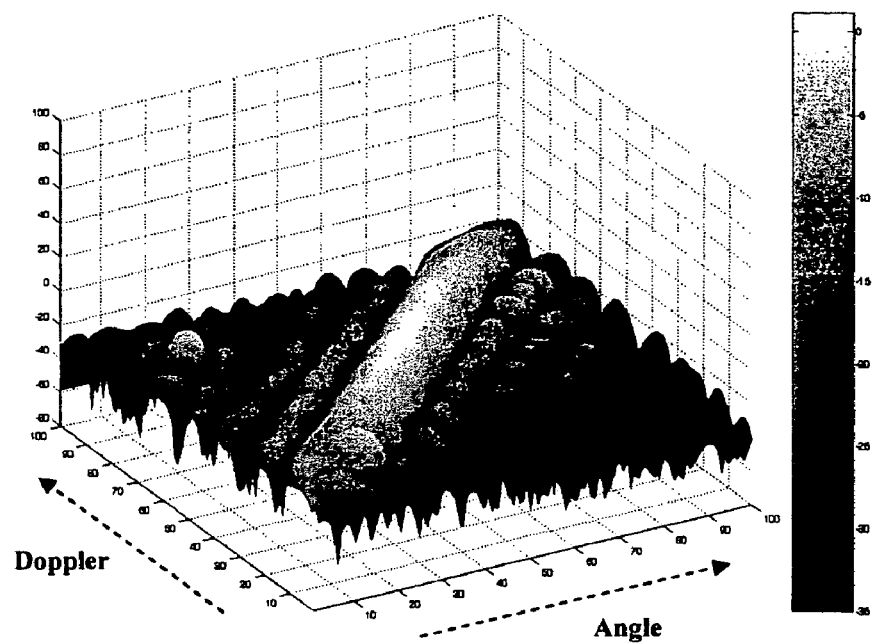
FIG. 5A illustrates a test projection in which the values are represented as elevation.
Figure 5B:
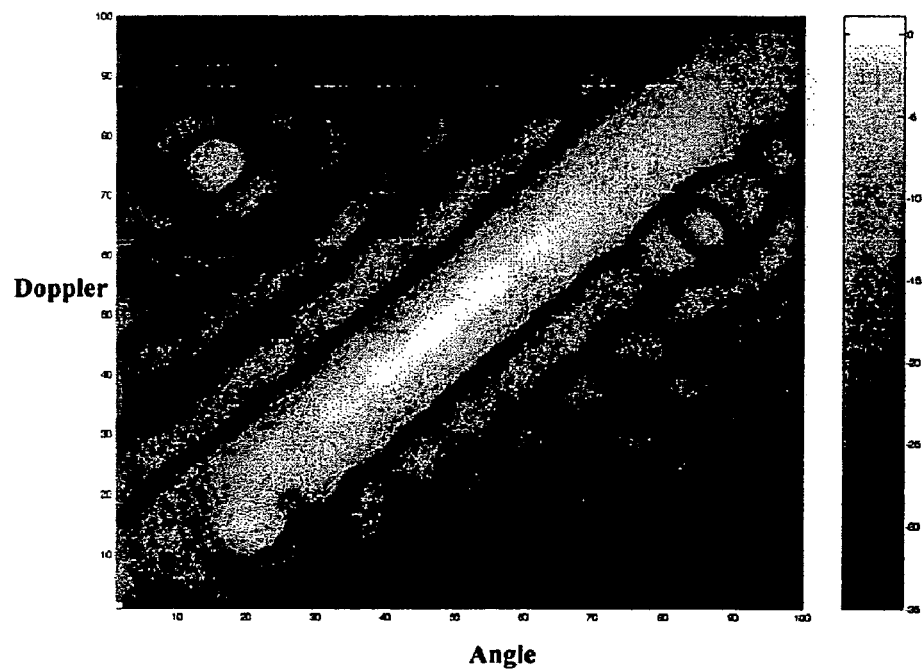
FIG. 5B illustrates the test projection in which the values are represented with color intensity.

In step 206, projection computation module 152 computes a TEST PROJECTION shown in FIGS. 5A-B. FIG. 5A illustrates the TEST PROJECTION in which values are expressed as 3D elevation. FIG. 5B illustrates the TEST PROJECTION in 2D in which values are expressed as color.

Figure 6:
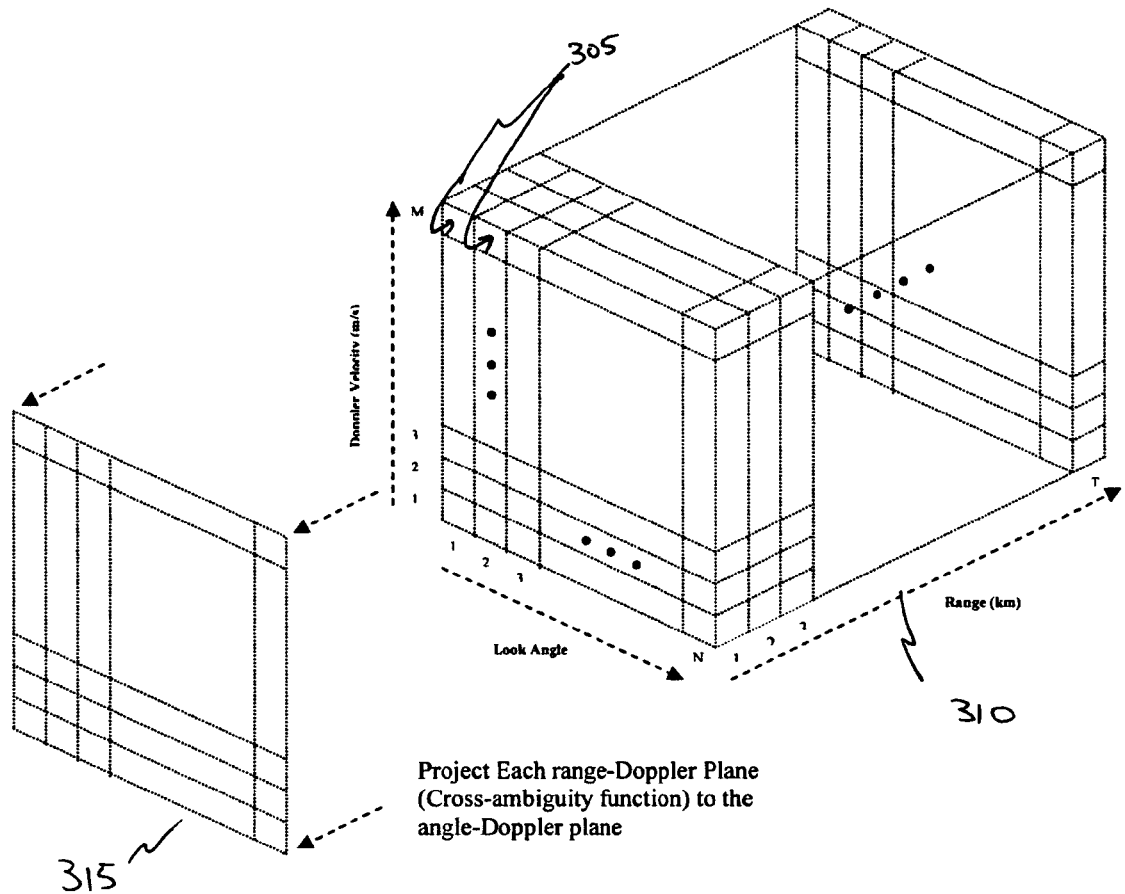
FIG. 6 illustrates the computation of the test projection.

FIG. 6 illustrates the concept behind the generation of the TEST PROJECTION. If, for the purposes of illustration only, the cross ambiguity functions 305 were computed for every angle (or receiver element, depending on the embodiment), the resulting cube would resemble a plurality of cross-ambiguity functions 310. For every three dimensional coordinate angle-Doppler shift-time delay there would be an intensity value. Then, for every angle-Doppler shift pair, values for all time delays are squared and summed. The resulting TEST PROJECTION 315 would have a value for every angle-Doppler shift coordinate. The value for every such coordinate is a summation of magnitude squared intensities corresponding to every time delay for this coordinate. The time delay dimension has been effectively collapsed.

In the preferred embodiment of the present invention, the TEST PROJECTION is calculated without ever computing the cross-ambiguity function. The governing equation for computation of the projection of a single cross-ambiguity function is:

$$P_\phi(u) = \int |A_{rs}(u \cos\phi - v \sin\phi, u \sin\phi + v \cos\phi)|^2 dv,$$

where $A_{rs}(\tau, \nu)$ is the cross-ambiguity function evaluated at time delay $\tau$ and Doppler shift $\nu$, $\phi$ is the projection angle, $\nu$ is the projection path, at an angle $\phi$ with respect to the delay axis of the cross-ambiguity function, and u is projection axis, perpendicular to the projection path.

Figure 7:
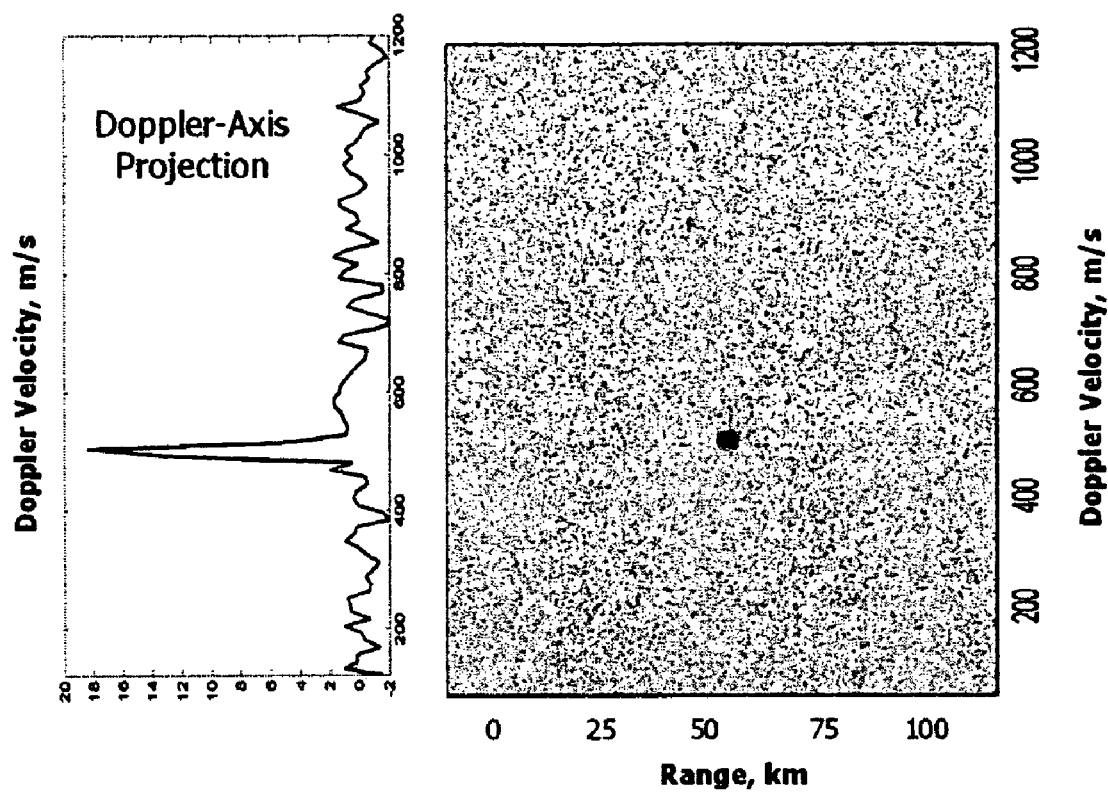
FIG. 7 illustrates a projection of a single cross-ambiguity function.

In the preferred embodiment, with reference to FIG. 6, a projection of every cross-ambiguity function 305 is computed along the Doppler shift axis (thus collapsing the time delay dimension), as shown in FIG. 7. A plurality of these projections, computed for every angle, form the TEST PROJECTION shown in FIGS. 5A-B.

In other words, in the preferred embodiment the TEST PROJECTION is computed by projecting a selected subspace of target and interference signal data representation in three dimensional angle-Doppler shift-time delay coordinate space illustrated in FIG. 6 along the time delay dimension to produce a target and interference signal data representation in two the dimensional angle-Doppler-shift coordinate space shown in FIGS. 5A-B. The selected subspace includes the entire angle-Doppler shift space and a restricted time delay, selected such that target contributions to the projections relative to the interference contributions to the projection are maximized. This is accomplished by time gating, in other words excluding processing signals with time delays known to have no targets. This does not require prior knowledge as to the time delay coordinates of targets. The selected time-delay subspace is being tested as a hypothesis, or a potential location of one or more targets. If one or more targets exist in this subspace, signal processor 128 detects these targets and discriminates between these targets and interference by following the subsequent steps shown in FIG. 2.

In the embodiment, in which signal processor 128 associates received signals with look angles as an intermediate step, the computation of the TEST PROJECTION is similar, except that the dimensions of the TEST PROJECTION are receiving element-Doppler shift. In one embodiment, signal processor 128 performs beam forming computation to transform the TEST PROJECTION to have the dimensions of angle and Doppler shift. In other embodiments this beam forming transformation can may also be performed in steps 208, 210 or 212.

Figure 8A:
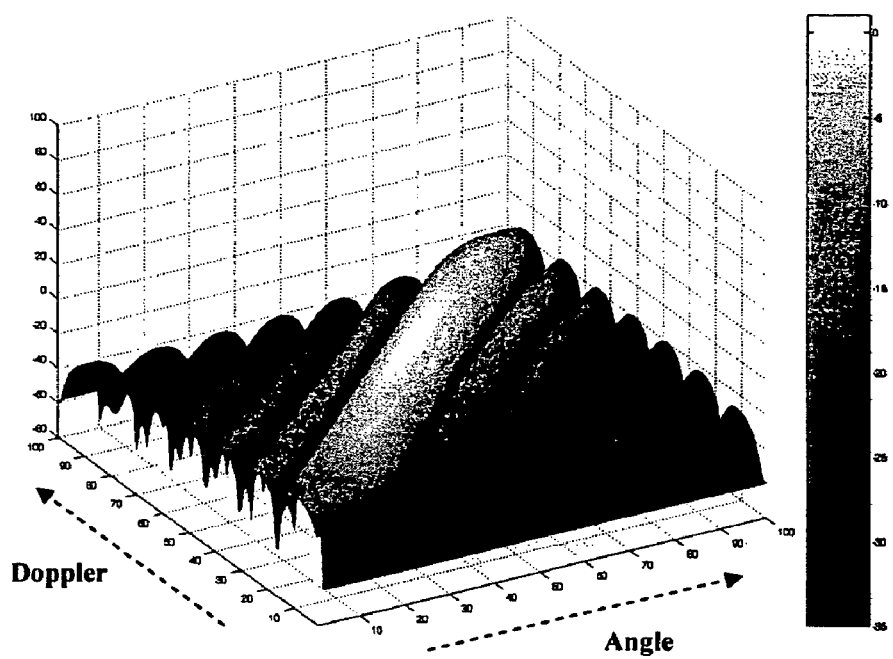
FIG. 8A illustrates a projection interference estimate in which the values are represented as 3D elevation.
Figure 8B:
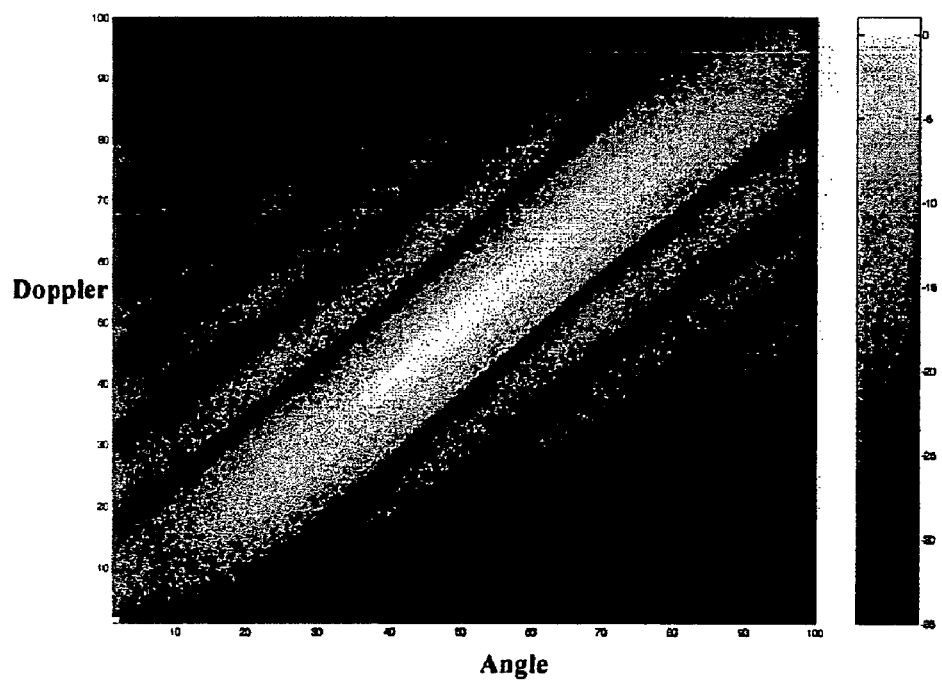
FIG. 8B illustrates the projection interference estimate in which values are represented with color intensity.

In step 208, interference projection estimation module 154 computes a PROJECTION INTERFERENCE ESTIMATE shown in FIG. 8 by projecting a selected subspace of the target and interference signal data representation in three dimensional angle-Doppler shift-time delay coordinate space shown in FIG. 6 along the time-delay dimension to produce an interference signal data representation in two dimensional angle-Doppler shift coordinate space similar to the TEST PROJECTION shown in FIGS. 5A-B. The selected subspace used to generate the PROJECTION INTERFERENCE ESTIMATE includes the entire angle-Doppler shift space and may include a restricted time-delay space, selected such that interference contributions to projections that constitute the PROJECTION INTERFERENCE ESTIMATE are maximized relative to target contributions to those projections. This does not require prior knowledge as to the time-delay coordinates of targets. The time-delay subspace selected for computation of the PROJECTION INTERFERENCE ESTIMATE is determined given consideration to the time delay subspace that is being tested as a hypothesis, or potential location of targets in the generation of the TEST PROJECTION.

In one embodiment, interference projection estimation module 154 generates the PROJECTION INTERFERENCE ESTIMATE by applying a 2D low pass filter to the TEST PROJECTION. In another embodiment, interference projection estimation module 154 computes the PROJECTION INTERFERENCE ESTIMATE by processing reflections of similar terrain known to have no targets. For example, STAP system 100 may be aware that there are one or more targets at a distance between 100 km and 200 km at a particular angle and that there are no targets at a distance between 50 km and 100 km at the same angle. The terrain between 50 km and 200 km is the similar; for example, it may be uniform forest or desert. In this embodiment, signal processor 128 may take the PROJECTION INTERFERENCE ESTIMATE of the terrain between 50 km and 100 km.

In another embodiment, projection estimation module 154 makes use of prior knowledge of the interference dependence upon angle and Doppler-shift coordinates in the TEST PROJECTION when generating the PROJECTION INTERFERENCE ESTIMATE. Some factors in determining the prior knowledge of the interference dependence on angle and Doppler frequency include transmit array 104 and receive array 108 beam pattern, the location of transmit array 104 and receive array 108, the target location, and the sources of interference, such as geographical features, atmospheric features and jammers.

In another embodiment, signal processor 128 has the PROJECTION INTERFERENCE ESTIMATE from prior test flight data.

In step 210, interference projection normalization module 156 generates a NORMALIZED PROJECTION INTERFERENCE ESTIMATE such that its values match as closely as possible to the magnitude values of the interference contributions in the TEST PROJECTION. Because the operations are performed in angle-Doppler shift domain with the time delay dimension collapsed, interference projection normalization module 156 mitigates the differences in ranges used in computing the TEST PROJECTION and the PROJECTION INTERFERENCE ESTIMATE. For example, the TEST PROJECTION may have been obtained for ranges 100 km to 150 km, and the PROJECTION INTERFERENCE ESTIMATE may have been obtained for ranges 50 km to 100 km. In this situation, clutter integrated over the range 50 km to 100 km will not be representative of clutter in the range of 100 km to 150 km. Therefore, values of the PROJECTION INTERFERENCE ESTIMATE are normalized to match the interference contribution(s) in the TEST PROJECTION and the NORMALIZED PROJECTION INTERFERENCE ESTIMATE is computed.

The preferred method for normalization depends on many factors. One such factor, for example, is the proximity of the time delay subspace used in the generation of the PROJECTION INTERFERENCE ESTIMATE to the time delay subspace used in the generation of the TEST PROJECTION. The normalization itself may be a subtraction or addition of a predetermined, or a dynamically computed value, to the values of the PROJECTION INTERFERENCE ESTIMATE, or multiplication of the values of the PROJECTION INTERFERENCE ESTIMATE by a predetermined or dynamically computed value. In alternative embodiments, projection normalization module 156 uses more complex methods of normalizations.

Figure 9A:
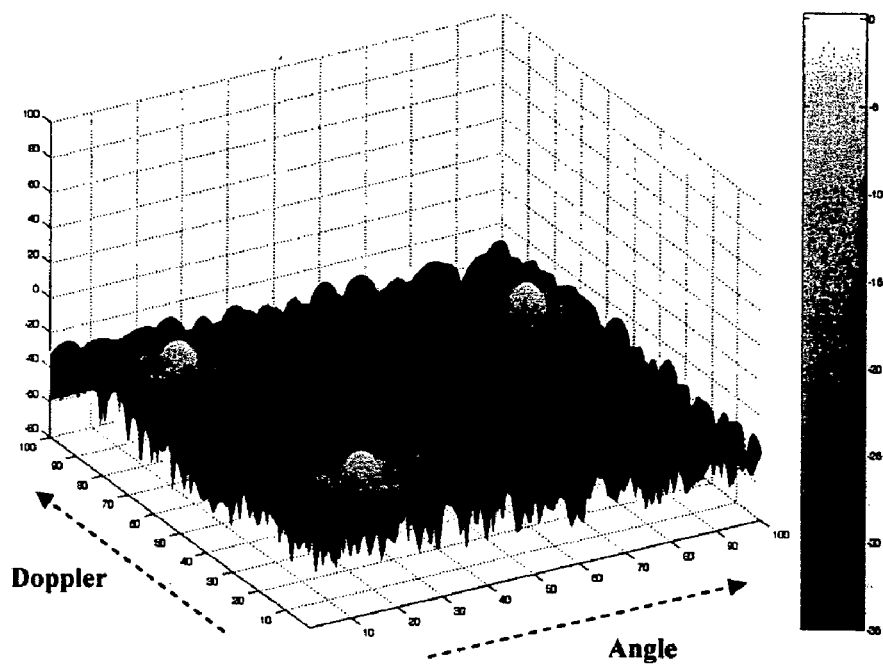
FIG. 9A illustrates a projection target estimate in which the values are represented as 3D elevation.
Figure 9B:
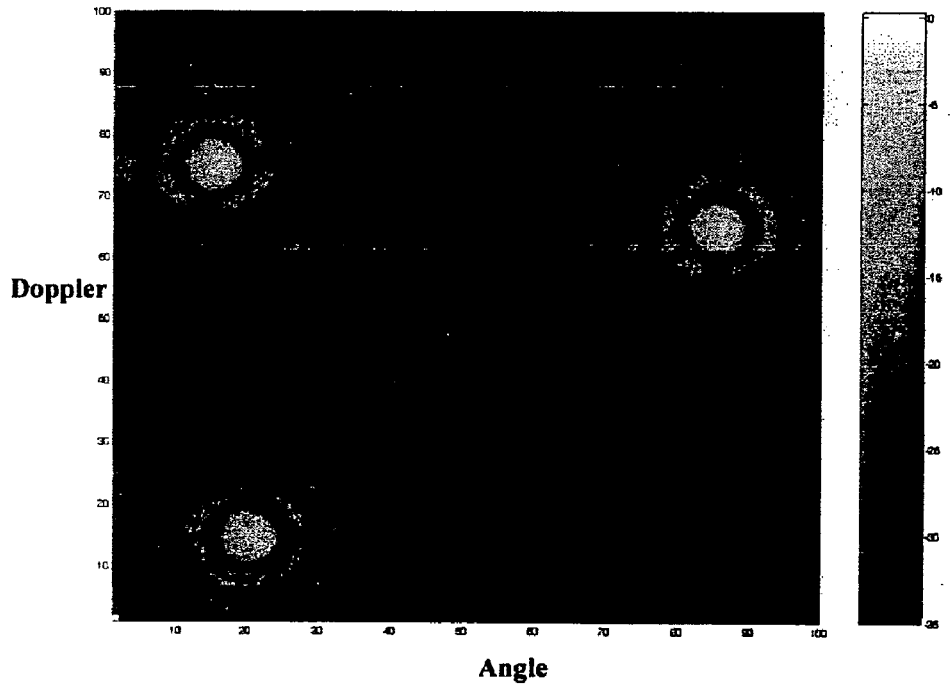
FIG. 9B illustrates the projection target estimate in which values are represented with color intensity.

In step 212, projection target estimation module 158 computes a PROJECTION TARGET ESTIMATE in which the target contributions are maximized and interference contributions are reduced, as illustrated in FIGS. 9A-B. The PROJECTION TARGET ESTIMATE is a target signal data representation in two dimensional angle-Doppler shift coordinate space that projection target estimation module 158 generates by filtering the PROJECTION INTERFERENCE ESTIMATE from the TEST PROJECTION. In one embodiment, projection target estimation module 158 computes the PROJECTION TARGET ESTIMATE by subtracting values of the normalized PROJECTION INTERFERENCE ESTIMATE from values of the TEST PROJECTION with respective coordinates in the angle-Doppler-shift coordinate space. In another embodiment, projection target estimation module 158 divides values of TEST PROJECTION by values of the PROJECTION INTERFERENCE ESTIMATE with respective coordinates in the angle-Doppler shift coordinate space. To avoid division by zero or by a very small number, projection target estimation module 158 may add a constant value to all values of the PROJECTION INTERFERENCE ESTIMATE prior to performing the division operation. In other embodiments, projection target estimation module 158 employs other methods of reducing the interference contributions(s) from the TEST PROJECTION.

In step 214, projection threshold comparator 160 computes a PROJECTION THRESHOLD EXCEEDANCE illustrated in FIG. 10. The PROJECTION THRESHOLD EXCEEDANCE is target threshold exceedance data representation in two dimensional angle-Doppler shift coordinate space that is created by a threshold exceedance test performed on data values of the PROJECTION TARGET ESTIMATE.

In one embodiment, projection threshold comparator 160 compares each value of the PROJECTION TARGET ESTIMATE to a predetermined or adaptively selected threshold. If a value of the PROJECTION TARGET ESTIMATE is greater than or equal to the value of the threshold, then projection threshold comparator 160 sets the value of '1' in the PROJECTION THRESHOLD EXCEEDANCE for the corresponding coordinates. If a value of the PROJECTION TARGET ESTIMATE is less than the value of the threshold, then the projection threshold comparator 160 sets the value of '0' in the PROJECTION THRESHOLD EXCEEDANCE for the corresponding coordinates.

In another embodiment, projection threshold comparator 160 identifies peaks of the PROJECTION TARGET ESTIMATE. After projection threshold comparator 160 identifies the peaks it compares them to the threshold. If a value of a peak is greater or equal to the value of the threshold, then projection threshold comparator 160 sets the value of '1' in the PROJECTION THRESHOLD EXCEEDANCE for the corresponding coordinates. Otherwise, projection threshold comparator 160 sets the value of '0' in the PROJECTION THRESHOLD EXCEEDANCE for the corresponding coordinates. After the completion of step 214, signal processor 128 has determined angles at which the targets are located with respect to the STAP system 100, and Doppler shifts of those targets.

Figure 11:
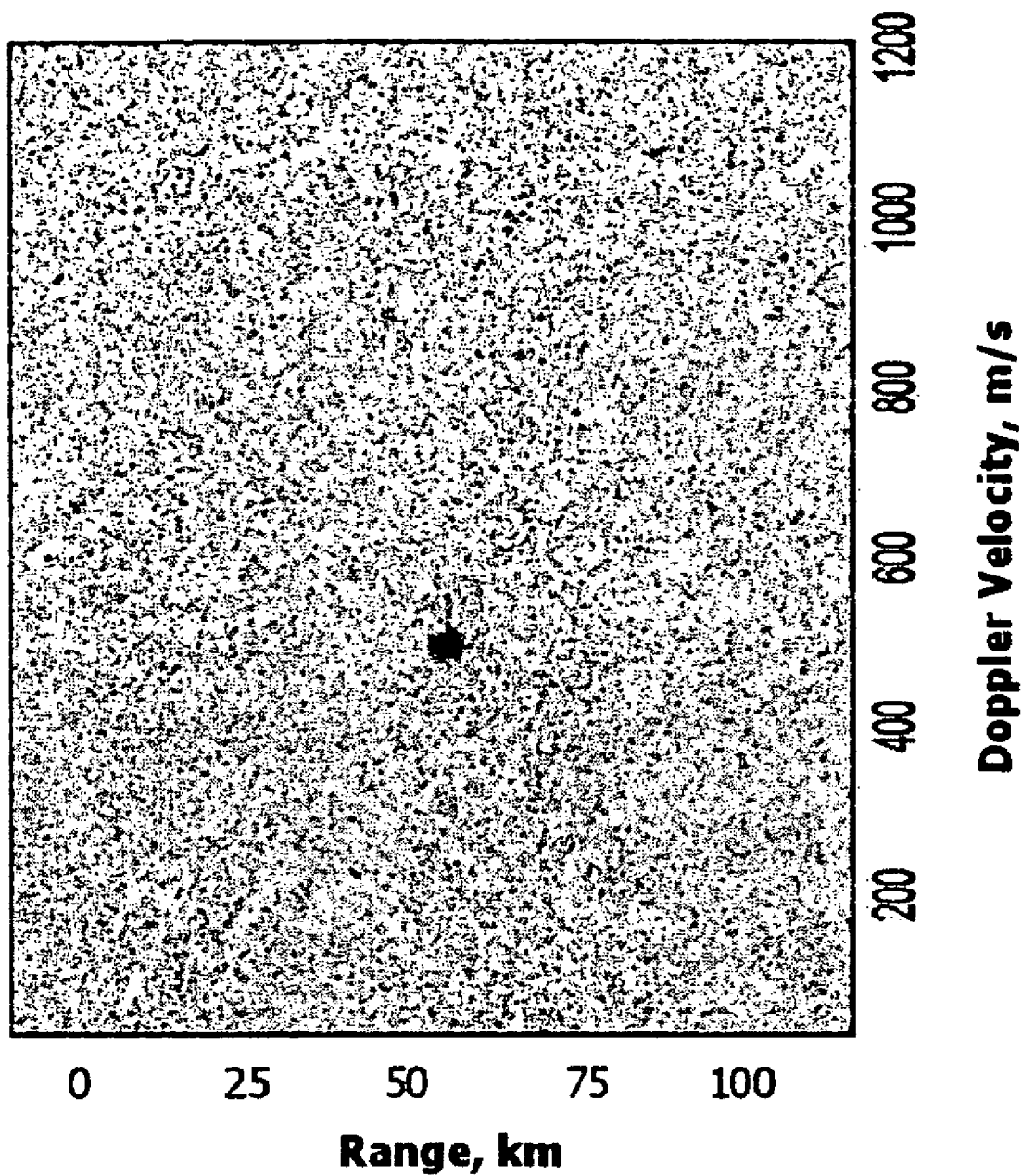
FIG. 11 illustrates a cross ambiguity function in which values are represented as color intensities.
Figure 12:
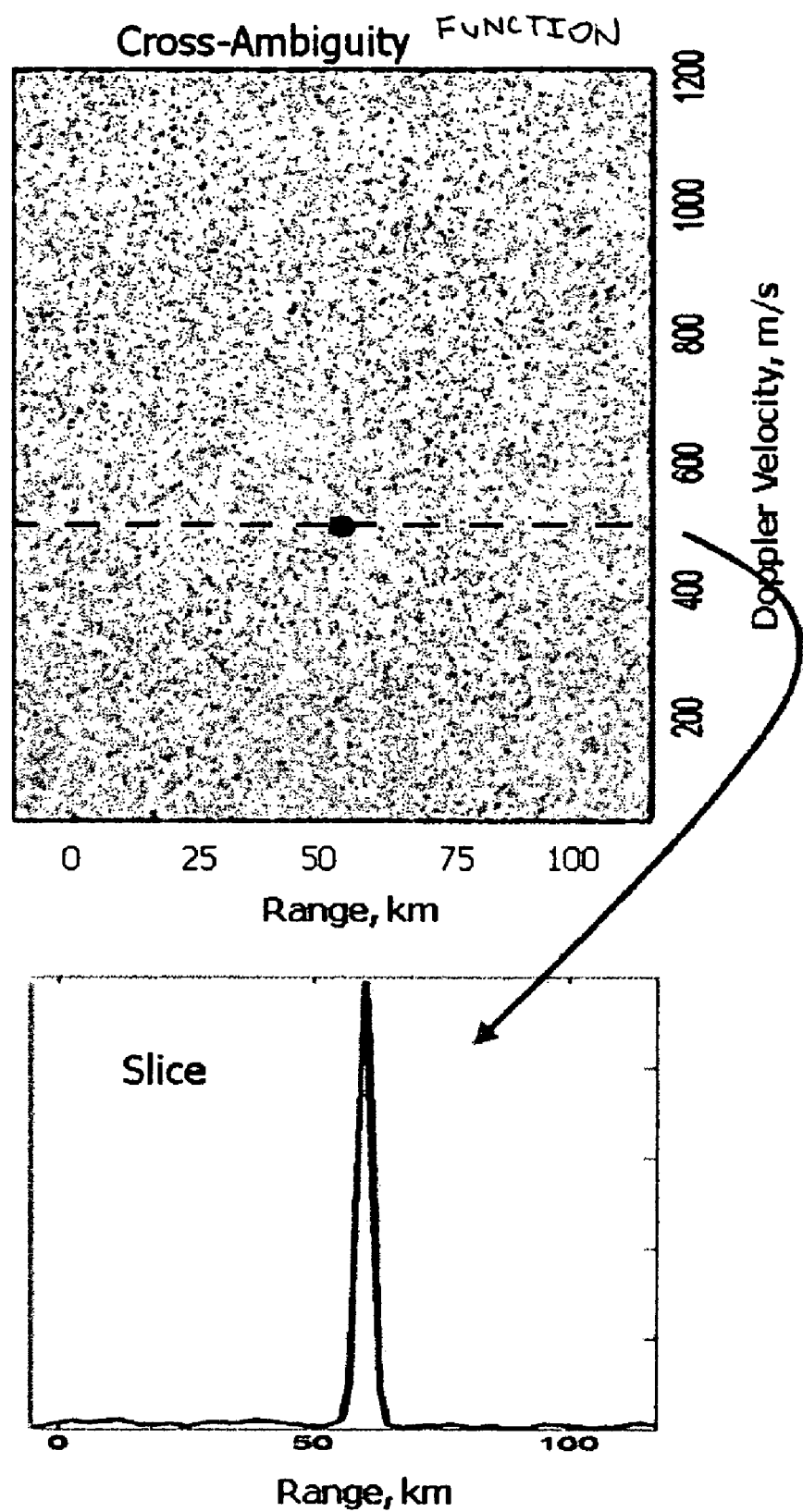
FIG. 12 illustrates a test slice a cross-ambiguity function in which values are represented as color intensities.
Figure 13:
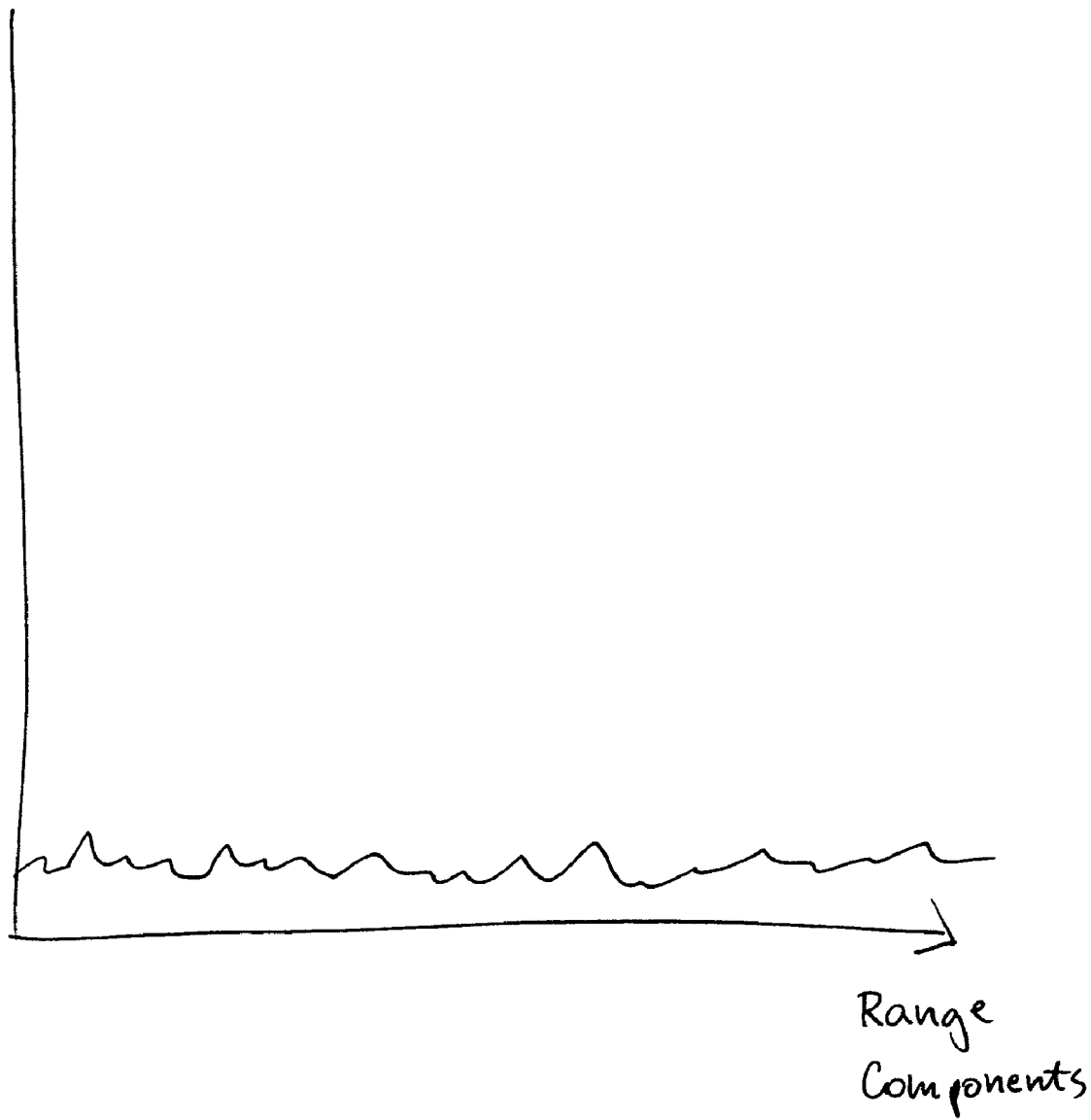
FIG. 13 illustrates a slice interference estimate.

In step 216, slice computation module 162 computes a TEST SLICE. A slice is a plurality of values of a function lying along a line or line segment. An illustration of a slice of a cross ambiguity function illustrated in FIG. 11 is shown in FIG. 12.

The governing equation for the computation of a slice of a cross-ambiguity function at an arbitrary angle ($\phi$) is:

$$A_{rs}(\tau_0 + \lambda \sin \phi, v_0 + \lambda \cos \phi) = \int \hat{r}_{2\phi/\pi}(\mu) \hat{s}_{2\phi/\pi}(\mu) \exp[j2\pi\mu] d\mu,$$

where:
$\tau_0$ is the starting delay time of the slice,
$v_0$ is the starting Doppler shift of the slice
$\lambda$ is the distance of the computed slice sample from the starting point
$\phi$ is the angle of the slice
and where:

$\hat{r}(t) = r(t + \tau_0/2) \exp[j\pi v_0 t]$ and
$\hat{s}(t) = r(t - \tau_0/2) \exp[j\pi v_0 t]$ are the fractional Fourier transforms of the shifted and modulated received and transmitted radar waveforms,
and where:
$X_{2\phi/\pi}(t) = \int K_{2\phi/\pi}(t,t') x(t') dt'$ defines the fractional Fourier transformation
and where:
$\phi$ is the transformation angle
$K_{2\phi/\pi}$ is the transformation kernel defined as:

$$K_{2\phi/\pi}(t,t') = k_\phi \exp[j\pi(t^2 \cot \phi - 2tt' \csc \phi + t'^2 \cot \phi]$$

With complex scaling $k_\phi$ defined as:

$$k_\phi = \frac{\exp\{j\phi/2 - \pi/4 \operatorname{sgn}\phi 22/\}}{\sqrt{|\sin\phi|}}$$

As seen from the above equations, slice computation module 162 does not calculate the cross-ambiguity function to compute the slice of the cross-ambiguity function. Slice computation module 162 identifies an angle and a Doppler shift coordinates at which at least one target is present by analyzing the PROJECTION THRESHOLD EXCEEDANCE. For that angle and Doppler shift coordinate, slice computation module 162 computes the TEST SLICE of the cross-ambiguity function along the time-delay axis.

Figure 14:
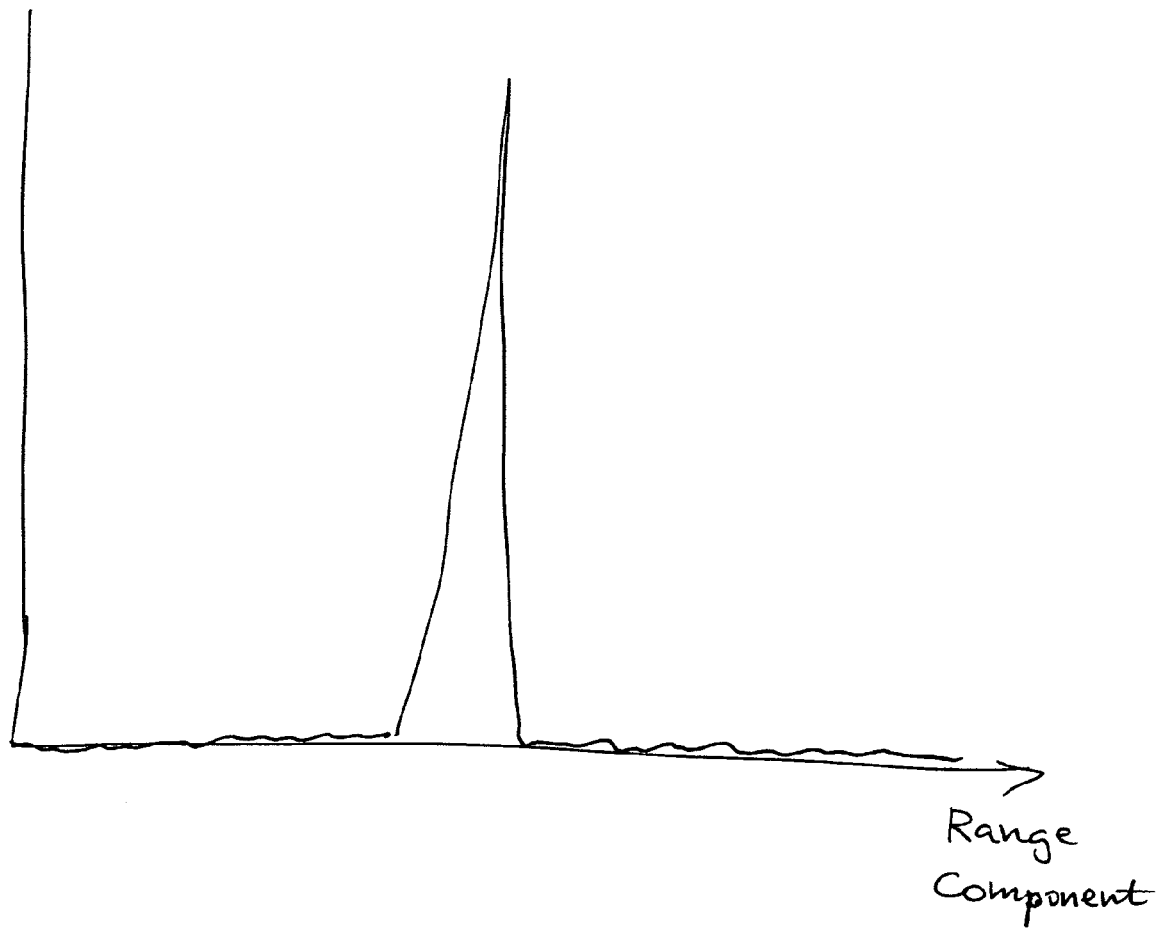
FIG. 14 illustrates generation of a slice target estimate.

In step 218, interference slice estimation module 164 computes a SLICE INTERFERENCE ESTIMATE. In one embodiment, illustrated in FIG. 14, interference slice estimation module 164 applies a low pass filter to the TEST SLICE to compute the SLICE INTERFERENCE ESTIMATE. In another embodiment, interference slice estimation module 164 computes the SLICE INTERFERENCE ESTIMATE using clutter from a different range, which is known to have no targets. In another embodiment, interference slice estimation module 164 computes the SLICE INTERFERENCE ESTIMATE from the prior knowledge of the surrounding conditions obtained from, for example, prior test flights.

In another embodiment, with reference to step 218, slice computation module 162 may compute one or more additional slices of the cross-ambiguity function associated with the same angle, but different Doppler shift, as the TEST SLICE, to compute the SLICE INTERFERENCE ESTIMATE. Slice computation module 162 computes these additional slices so they are parallel to the TEST SLICE. Interference slice estimation module 164 may use one or more of the values of the newly calculated slices to generate the SLICE INTERFERENCE ESTIMATE.

In step 240, slice target estimation module 166 computes a SLICE TARGET ESTIMATE. Slice target estimation module 166 computes a SLICE TARGET ESTIMATE by filtering the SLICE INTERFERENCE ESTIMATE from the TEST SLICE. In one embodiment, slice target estimation module 166 subtracts values of the SLICE INTERFERENCE ESTIMATE from the corresponding values of the TEST SLICE resulting in the SLICE TARGET ESTIMATE. In another embodiment, slice target estimation module 166 divides values of the TEST SLICE by the corresponding values of the SLICE INTERFERENCE ESTIMATE. To avoid the possibility of division by zero or by a very small number, slice target estimation module 166 may add a constant number to values of the SLICE INTERFERENCE ESTIMATE.

In step 220, slice threshold comparator 168 computes a SLICE THRESHOLD EXCEEDANCE. The SLICE THRESHOLD EXCEEDANCE is a target threshold exceedance data representation in one dimensional time delay coordinate space, for the given angle and Doppler shift. The SLICE THRESHOLD EXCEEDANCE may contain information regarding zero, one, or multiple targets having the same angle and Doppler shift, but unique time delay. In one embodiment, slice threshold comparator 168 computes the SLICE THRESHOLD EXCEEDANCE by comparing each value of the SLICE TARGET ESTIMATE to a predetermined or adaptively selected threshold value. For values of the SLICE TARGET ESTIMATE that are greater than or equal to the threshold, slice threshold comparator 168 sets the value for the corresponding coordinate in the SLICE THRESHOLD EXCEEDANCE to '1'. For all values of the SLICE TARGET ESTIMATE that are less than the threshold, slice threshold comparator 168 sets the value for the corresponding coordinate in the SLICE THRESHOLD EXCEEDANCE to '0'.

In another embodiment, slice threshold comparator 168 identifies peaks of the SLICE TARGET ESTIMATE. After the peaks have been identified, slice threshold comparator 168 compares them to the threshold. If a value of a peak is greater than or equal to the value of the threshold, then slice threshold comparator 168 sets the value of the corresponding coordinate of the SLICE THRESHOLD EXCEEDANCE to '1'. For all values of the SLICE TARGET ESTIMATE that are less than the threshold, slice threshold comparator 168 sets the value of the corresponding coordinate in the SLICE THRESHOLD EXCEEDANCE to '0'.

In step 222, after the SLICE THRESHOLD EXCEEDANCE is computed, reporting module 170 generates a TARGET REPORT. The TARGET REPORT provides the angle-Doppler shift-time delay coordinates of one or more targets that are. Reporting module 170 identifies targets by finding non-zero values in the SLICE THRESHOLD EXCEEDANCE.

In one embodiment, signal processor 128 executes steps 216, 218, 240, 220 and 222 sequentially for each angle-Doppler shift coordinates identified by '1' in the PROJECTION THRESHOLD EXCEEDANCE computed in step 214. In another embodiment, signal processor 128 perform steps 216, 218, 240, 220 and 222 in parallel for all angle-Doppler shift coordinates identified by '1' in the PROJECTION THRESHOLD EXCEEDANCE. In yet another embodiment, signal processor 128 executes each of the steps 216, 218, 240, 220 and 222 for all angle-Doppler shift coordinates identified by '1' in the PROJECTION THRESHOLD EXCEEDANCE, before executing a subsequent step.

In the preferred embodiment, signal processor 128 makes the TARGET REPORT available to tracker 130. Tracker 130 computers a trajectory of detected targets. Tracker 130 may also perform further target discrimination by analyzing trajectories of targets.

In the preferred embodiment, factors such as the number and nature of the detected targets, the terrain, presence of signals from ECM, etc., may be used in selecting modulation types of waveforms generated by waveform generator 102. Waveform generator 102 may generate waveforms based on the interference estimates. In particular, it can generate waveforms with modulation orthogonal to at least some interference.

The systems and methods of detection, discrimination and tracking of targets in the presence of interference, such as environmental clutter, noise, and electronic countermeasures disclosed herein are computationally effective. These systems and methods, unlike the prior art STAP systems can perform detection of targets by transmitting a single Doppler fragile signal, which may have an arbitrarily complex modulation type. Furthermore, the disclosed systems and methods do not use matched filters to identify the reflections of the transmitted signals. Compared to prior art methods of STAP target detection, these systems and methods do not require multiple copies of the same hardware components and therefore can be utilized to increase system mobility due to reduced size, weight and power; increase detection range due to the increased detection sensitivity, and reduced probability of intercept by an enemy due to reduced peak power waveforms and the enabling of arbitrarily complex modulation type waveforms.

The systems and methods disclosed herein transmit a single signal to detect targets. Because the systems and methods disclosed herein perform signal processing by computing projections and slices of the cross-ambiguity function and do not a matched filter, the transmitted signals may be long and Doppler fragile. Therefore the systems and methods disclosed herein use of longer waveforms and modulation types such as pseudorandom number (PN) coded waveform, COSTAS waveforms, or other waveforms that can be coded during the STAP system operation for improved time delay and Doppler shift resolution, target imaging, operational stealth, and imperviousness to ECM.

The disclosed systems and methods may utilized the use of long transmitted signals to reduce peak power requirements out of the transmitter, while maintaining a requisite total signal energy on target for detection. By reducing the peak power requirement, the systems and methods offers the enables the reduction in size, weight, power, and cost of the transmitter.

The systems and methods may also use longer waveforms to increase the total signal energy out of the transmitter delivered to the detected target. Increasing signal energy delivered to the detected target, increases detection sensitivity, enabling the use of higher threshold during exceedance computations, which in turn results in the reduced probability of falsely identified targets. The increase in length of the transmitted signal compared to prior art pulse train systems is frequently large enough to support both a reduction in peak power as well as an increase in total energy delivered to the target.

Because the systems and methods disclosed herein can effectively detect targets with a single transmitted signal instead of a pulse train, they do not require multiple delay intervals between multiple pulses. Therefore the delay that the systems and methods uses after the signal transmission is long enough for achieving unambiguous range delay determination. This substantially reduces the time required to detect a target compared to the prior art STAP systems. Furthermore, due to the reduced processing interval required for detection of targets, the disclosed systems and methods offer the benefit of the increased the duty cycles to more effectively use the time in the target interrogation schedule. Accordingly the disclosed systems and methods may perform more target detections during a given time interval compared to the prior art STAP systems.

Additionally, the disclosed systems and methods avoid the time delay and Doppler shift ambiguity trade-off all together because a single pulse is transmitted and then the next pulse is not transmitted until the return from the furthest target is received. PRI does not need to be increased since a single pulse system does not have a PRF driven maximum unambiguous Doppler shift limitation.

Prior art STAP systems capture raw data to generate the STAP data cube and then process this data in 3 dimensions.

The prior art STAP systems perform the angle, Doppler shift, and range calculations and the interference estimation and filtering process for every sample in the 3 dimensional data cube.

The disclosed systems and methods collapse the 3 dimensional STAP cube to a 2 dimensional angle-Doppler shift representation before performing interference estimation and filtering and optionally angle processing. Furthermore, the systems and methods derive the Doppler shift information for the 2 dimensional angle-Doppler shift representation of the STAP cube by computing projections of the cross-ambiguity function instead of computing the cross-ambiguity function itself. Furthermore, only when the systems and methods find a projection exceedence in the angle-Doppler shift representation, they compute slices and perform slice operations to extract the angle-Doppler shift-time delay coordinates and signal amplitudes for the detected targets. The efficiency of this processing compared to the prior art systems results in reduced number of operations, as well as the order of complexity, required to discriminate, detect and track targets in the presence of interference.

The invention described and claimed herein is not to be limited in scope by the exemplary embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

In further embodiments, this invention also includes computer readable media (such as hard drives, non-volatile memories, CD-ROMs, DVDs, network file systems) with instructions for causing a processor or a computer system to perform the methods of this invention, special purpose integrated circuits designed to perform the methods of this invention, and the like.

We claim:

1. A method for detecting one or more targets comprising:
receiving signals including reflections from the one or more targets and interference;
computing one or more projections of cross-ambiguity functions of processed or unprocessed received signals and a reference signal;
processing the one or more computed projections to reduce interference contribution(s), wherein the processing comprises performing a mathematical operation on a value of the one or more computed projections, said value having angle-Doppler component coordinates;
determining an angle and a Doppler component for at least one target based on the processed computed projections; and
for the determined angle and Doppler component, determining a corresponding range component for the at least one target.

2. The method of claim 1, wherein the Doppler component is a Doppler shift.

3. The method of claim 1, wherein the Doppler component is a velocity.

4. The method of claim 1, wherein the range component is a time delay.

5. The method of claim 1, wherein the range component is a distance.

6. The method of claim 1, wherein the step of receiving is performed by multiple antenna elements.

7. The method of claim 1 further comprising the step of processing the received signals.

8. The method of claim 7, wherein the step of processing the received signals comprises multiplying the received signals by one or more complex quantities.

9. The method of claim 1, wherein interference is one or more of: clutter, noise, and signals from electronic countermeasure.

10. The method of claim 1, wherein interference is a signal generated by an electronic device.

11. The method of claim 1, wherein the reference signal is modulated using one or more of: continuous wave modulation, linear frequency modulation, pseudorandom number coded modulation, and frequency stepped COSTAS modulation.

12. The method of claim 11, wherein modulation type of the reference signal is selected adaptively.

13. The method of claim 1 further comprising the step of transmitting a signal.

14. The method of claim 1, wherein computing the one or more projections is based on the following equation: $P_\phi(u) = \int |A_{rs}(u \cos \phi - v \sin \phi, u \sin \phi + v \cos \phi)|^2 dv$, where $A_{rs}(\tau, v)$ is the cross-ambiguity function evaluated at time delay $\tau$ and Doppler shift $v$, $\phi$ is the projection angle, $v$ is the projection path, at an angle $\phi$ with respect to the delay axis of the cross-ambiguity function, and u is projection axis, perpendicular to the projection path.

15. The method of claim 1 further comprising estimating interference contribution(s) in angle-Doppler component domain.

16. The method of claim 15, wherein the mathematical operation is subtraction and a subtrahend is based on a value of estimated interference contribution(s) for the angle-Doppler component coordinates.

17. The method of claim 15, wherein the mathematical operation is division and a divisor is based on a value of estimate interference contribution(s) for the angle-Doppler component coordinates.

18. The method of claim 1, wherein the interference contribution(s) are previously known.

19. The method of claim 15, wherein estimating interference contribution(s) is based on prior knowledge.

20. The method of claim 19, wherein modulation of the reference signal is orthogonal to at least some interference.

21. The method of claim 1, wherein the step of determining the angle and the Doppler component comprises comparing values of the processed computed projections to a threshold.

22. The method of claim 21, wherein the step of determining the angle and the Doppler component further comprises detecting one or more peaks of the processed computed projections.

23. The method of claim 1, wherein determining the corresponding range component comprises computing a slice of the cross-ambiguity function of the processed or unprocessed received signals and the reference signal.

24. The method of claim 23, wherein the slice is computed through cross-ambiguity function associated with the determined angle and at the determined Doppler component.

25. The method of claim 23, wherein computing the one or more slices is based on the following equation: $A_{rs}(\tau_0 + \lambda \sin \phi, v_0 + \lambda \cos \phi) = \int \hat{r}_{2\phi/\pi}(\mu) \hat{s}^*_{2\phi/\pi}(\mu) \exp[j2\pi\mu] d\mu$, where $\tau_0$ is the starting delay time of the slice, $v_0$ is the starting Doppler shift of the slice, $\lambda$ is the distance of the computed slice sample from the starting point, $\phi$ is the angle of the slice, and where $\hat{r}(t) = r(t + \tau_0/2) \exp[j\pi v_0 t]$ and $\hat{s}(t) = r(t - \tau_0/2) \exp[j\pi v_0 t]$ are the fractional Fourier transforms of the shifted and modulated received and reference radar waveforms, and where $X_{2\phi/\pi}(t)$ $=\int K_{2\phi/\pi}(t,t')x(t')dt'$ defines the fractional Fourier transformation and where $\phi$ is the transformation angle $K_{2\phi/\pi}$ is the transformation kernel defined as $K_{2\phi/\pi}(t,t')=k_\phi \exp[j\pi(t^2 \cot \phi - 2tt' \csc \phi + t'^2 \cot \phi]$ with complex scaling $k_\phi$ defined as $$k_\phi = \frac{\exp\{j\phi/2 - \pi/4\mathrm{sgn}\phi 22/\}}{\sqrt{|\sin\phi|}}.$$

26. The method of claim 23 further comprising processing the computed slice to reduce interference contribution(s).

27. The method of claim 26 further comprising estimating interference contribution(s) in a range component domain.

28. The method of claim 27, wherein processing the computed slice comprises performing a mathematical operation on a value of the computed slice, said value associated with a range component coordinate.

29. The method of claim 28, wherein the mathematical operation is subtraction and a subtrahend is based on a value of estimated interference contribution(s) for the range component coordinate.

30. The method of claim 28, wherein the mathematical operation is division and a divisor is based on a value of estimated interference contribution(s) for the range component coordinates.

31. The method of claim 26, wherein the interference contribution(s) are previously known.

32. The method of claim 31, wherein estimating interference contribution(s) is based on prior knowledge.

33. The method of claim 26, wherein the step of determining the range component comprises comparing values of the processed computed slice to a threshold.

34. The method of claim 33, wherein the step of determining the range component further comprises detecting one or more peaks of the processed computed slice.

35. The method of claim 1 further comprising generating a target report based on the one or more angles, one or more Doppler components, and one or more range components at which the one or more targets are present.

36. A system for detecting one or more targets comprising:
a receiver operable to receive signals including reflections from the one or more targets and interference; and
a signal processor comprising:
a projection computation module operable to compute one or more projections of cross ambiguity functions corresponding to processed or unprocessed received signals and a reference signal,
a projection target estimation module operable to process the one or more computed projections to reduce interference contributions(s) in the one or more computed projections,
a projection threshold comparator operable to determine an angle and a Doppler component of at least one target based on the processed one or more projections, and
a slice threshold comparator operable to determine a corresponding range component for the at least one target corresponding to the determined angle and Doppler component.

37. The system of claim 36, wherein the receiver comprises multiple antenna elements.

38. The system of claim 36, wherein the interference is one or more of clutter, noise, and signals from electronic countermeasures.

39. The system of claim 36, wherein the interference is generated by an electronic device.

40. The system of claim 36 further comprising a transmitter operable to transmit a modulated signal.

41. The system of claim 36, wherein the signal processor further comprises a interference projection estimation module operable to estimate interference in an angle-Doppler component domain.

42. The system of claim 41, wherein the signal processor further comprises an interference projection normalization module operable to perform a mathematical operation on values of the estimated interference in the angle-Doppler component domain.

43. The system of claim 36, wherein the signal processor further comprises a slice computation module operable to compute a slice of a cross ambiguity surface.

44. The system of claim 43, wherein the signal processor further comprises a interference slice estimation module operable to estimate interference in a range component domain.

45. The system of claim 44, wherein the signal processor further comprising a slice target estimation module operable to process the computed slice to reduce interference contributions(s) in the slice.

46. The system of claim 36 further comprising a reporting module operable to generate a report comprising one or more of: the determined angle, the determined Doppler component, and the determined range component.

47. The system of claim 46 further comprising a tracker operable to compute trajectories of the detected targets.

48. The system of claim 36 further comprising one or more memories operable to store instructions executed by the signal processor.

49. The system of claim 36 further comprising one or more memories operable to store results of intermediate computations of the signal processor.

50. The system of claim 36, wherein the projection computation module, the projection target estimation module, the projection threshold comparator, and the slice threshold comparator are at different processors.

51. The system of claim 36, wherein the projection computation module, the projection target estimation module, the projection threshold comparator, and the slice threshold comparator are at a single processor.

52. A machine readable medium having stored thereon data representing sequences of instructions, which when executed by a computer system cause the computer system to perform the steps of:
computing one or more projections of cross-ambiguity functions of (1) processed or unprocessed received signals that include reflections from one or more targets and interference, and (2) a reference signal;
processing the one or more computed projections to reduce interference contribution(s), wherein the processing comprises performing a mathematical operation on a value of the one or more computed projections, said value having angle-Doppler component coordinates;
determining an angle and a Doppler component for at least one target based on the processed computed projections; and
for the determined angle and Doppler component, determining a corresponding range component for the at least one target.

53. The machine readable medium of claim 52 further having stored thereon data representing sequences of instructions, which when executed by the computer system cause the computer system to perform the step of processing the received signals.

54. The machine readable medium of claim 53 further having stored thereon data representing sequences of instructions, which when executed by the computer system causes the computer system to perform the step of processing the received signals by multiplying the signals by one or more complex quantities.

55. The machine readable medium of claim 53, wherein interference is one or more of: clutter, noise, and signals from electronic countermeasure.

56. The machine readable medium of claim 53 further having stored thereon data representing sequences of instructions, which when executed by the computer system causes the computer system to perform the step of generating a waveform of the reference signal.

57. The machine readable medium of claim 53 further having stored thereon data representing sequences of instructions, which when executed by the computer system causes the computer system to perform the step of selecting a modulation type of the waveform.

58. The machine readable medium of claim 56, wherein the execution of the step of computing the one or more projections is based on the following equation: $P_\phi(u)=\int |A_{rs}(u \cos \phi - v \sin \phi, u \sin \phi + v \cos \phi)|^2 dv$, where $A_{rs}(\tau, v)$ is the cross-ambiguity function evaluated at time delay $\tau$ and Doppler shift $v$, $\phi$ is the projection angle, $v$ is the projection path, at an angle $\phi$ with respect to the delay axis of the cross-ambiguity function, and u is projection axis, perpendicular to the projection path.

59. The machine readable medium of claim 53 further having stored thereon data representing sequences of instructions, which when executed by the computer system causes the computer system to perform the step of estimating interference contribution(s) in angle-Doppler component domain.

60. The machine readable medium of claim 52, wherein the mathematical operation is subtraction and a subtrahend is based on a value of estimated interference contribution(s) for the angle-Doppler component coordinates.

61. The machine readable medium of claim 52, wherein the mathematical operation is division and a divisor is based on a value of estimate interference contribution(s) for the angle-Doppler component coordinates.

62. The machine readable medium of claim 59, wherein instructions causing the computer to perform the step of estimating interference contribution(s) use prior knowledge.

63. The machine readable medium of claim 57, wherein the modulation of the waveform is orthogonal to at least some interference.

64. The machine readable medium of claim 52, wherein instructions, which when executed by the computer system causing the computer system to perform the step of determining the angle and the Doppler component comprise instructions which when executed by the computer system cause the computer system to perform the step of comparing values of the processed computed projections to a threshold.

65. The machine readable medium of claim 64, wherein instructions, which when executed by the computer system causing the computer system to perform the step of determining the angle and the Doppler component comprise instructions which when executed by the computer system cause the computer system to perform the step of detecting one or more peaks of the processed computed projections.

66. The machine readable medium of claim 64, wherein instructions, which when executed by the computer system cause the computer system to perform the step of determining the corresponding range component comprise instructions, which when executed by the computer system cause the computer system to perform the step of computing a slice of the cross-ambiguity functions of to the processed or unprocessed received signals and the reference signal.

67. The machine readable medium of claim 66, wherein instructions cause the computer to compute the slice through cross-ambiguity function associated with the determined angle and at the determined Doppler component.

68. The machine readable medium of claim 67, wherein the execution of the step of computing the slice is based on the following equation: $A_{rs}(\tau_0+\lambda \sin \phi, v_0+\lambda \cos \phi)=\int \hat{r}_{2\phi/\pi}(\mu)\hat{s}^*_{2\phi/\pi}(\mu)\exp[j2\pi\mu]d\mu$, where $\tau_0$ is the starting delay time of the slice, $v_0$ is the starting Doppler shift of the slice, $\lambda$ is the distance of the computed slice sample from the starting point, $\phi$ is the angle of the slice, and where $\hat{r}(t)=r(t+\tau_0/2)\exp[j\pi v_0 t]$ and $\hat{s}(t)=r(t-\tau_0/2)\exp[j\pi v_0 t]$ are the fractional Fourier transforms of the shifted and modulated received and reference radar waveforms, and where $X_{2\phi/\pi}(t)=\int K_{2\phi/\pi}(t,t')x(t')dt'$ defines the fractional Fourier transformation and where $\phi$ is the transformation angle $K_{2\phi/\pi}$ is the transformation kernel defined as $K_{2\phi/\pi}(t,t')=k_\phi \exp[j\pi(t^2 \cot \phi - 2tt' \csc \phi + t'^2 \cot \phi]$ with complex scaling $k_\phi$ defined as $$k_\phi = \frac{\exp\{j\phi/2 - \pi/4 \operatorname{sgn}\phi 22/\}}{\sqrt{|\sin\phi|}}.$$

69. The machine readable medium of claim 66 further having stored thereon data representing sequences of instructions, which when executed by the computer system cause the computer system to perform the step of processing the computed slice to reduce interference contribution(s).

70. The machine readable medium of claim 69 further having stored thereon data representing sequences of instructions, which when executed by the computer system cause the computer system to perform the step of estimating interference contribution(s) in a range component domain.

71. The machine readable medium of claim 70, wherein instructions, which when executed by the computer system cause the computer system to perform the step of processing the computed slice comprise instructions causing the computer system to perform a mathematical operation on a value of the computed slice, said value associated with a range component coordinate.

72. The machine readable medium of claim 71, wherein the mathematical operation is subtraction and a subtrahend is based on a value of estimated interference contribution(s) for the range component coordinate.

73. The machine readable medium of claim 71, wherein the mathematical operation is division and a divisor is based on a value of estimated interference contribution(s) for the range component coordinates.

74. The machine readable medium of claim 70, wherein instructions causing the computer to perform the step of estimating interference contribution(s) use prior knowledge.

75. The machine readable medium of claim 70, wherein instructions, which when executed by the computer system cause the computer system to perform the step of determining the range component comprise instructions causing the computer system to perform the step of comparing values of the processed computed slice to a threshold.

76. The machine readable medium of claim 75, wherein instructions, which when executed by the computer system cause the computer system to perform the step of determining the range component further comprise instructions causing the computer system to perform the step of detecting one or more peaks of the processed computed slice.

77. The machine readable medium of claim 52 having further stored thereon data representing sequences of instructions, which when executed by a computer system cause the computer system to perform the step of generating a target report based on the one or more angles, one or more Doppler components, and one or more range components at which the one or more targets are present.

78. The method of claim 13, wherein the transmitted signal is the reference signal.

79. The system of claim 40, wherein the transmitted modulated signal is the reference signal.

80. The system of claim 79 further comprising a waveform generator operable to generate waveforms of the transmitted signal.

81. The system of claim 80, wherein the waveform generator is operable to generate the waveforms with one or more modulation types: continuous wave modulation, linear frequency modulation, pseudorandom number coded modulation, and frequency stepped COSTAS modulation.

82. The system of claim 81, wherein a type of modulation of the generated waveform is selected adaptively.

83. The system of claim 80, wherein a modulation of the transmitted signal is orthogonal to at least some interference.

* * * * *